US010453327B2

(12) United States Patent
Messier et al.

(10) Patent No.: US 10,453,327 B2
(45) Date of Patent: Oct. 22, 2019

(54) APPARATUS AND METHODS FOR GEOLOCATING AN INDIVIDUAL WITH RESPECT TO A PERIMETER

(71) Applicant: SAFETRACKS GPS CANADA INC., Red Deer (CA)

(72) Inventors: Yves Messier, Pierrefonds (CA); Antonio Fama, Kirkland (CA); Brian Miller, Kirkland (CA); François Gervais, Montreal (CA); Jerome Baron, Laval (CA); Patrick-Olivier Marquis, Sainte-Therese (CA)

(73) Assignee: SAFETRACKS GPS CANADA INC., Red Deer, AB (CA)

( * ) Notice: Subject to any disclaimer, the term of this patent is extended or adjusted under 35 U.S.C. 154(b) by 0 days.

(21) Appl. No.: 15/652,704

(22) Filed: Jul. 18, 2017

(65) Prior Publication Data
US 2017/0316677 A1 Nov. 2, 2017

Related U.S. Application Data

(62) Division of application No. 14/394,401, filed as application No. PCT/CA2013/050285 on Apr. 10, 2013.
(Continued)

(51) Int. Cl.
*G08B 25/01* (2006.01)
*G01S 19/10* (2010.01)
(Continued)

(52) U.S. Cl.
CPC .............. *G08B 25/016* (2013.01); *G01S 1/68* (2013.01); *G01S 5/0027* (2013.01); *G01S 19/10* (2013.01);
(Continued)

(58) Field of Classification Search
CPC ............ G08B 13/1427; G08B 13/2417; G08B 21/0219; G08B 21/0255; G08B 21/0275;
(Continued)

(56) References Cited

U.S. PATENT DOCUMENTS

| 5,504,474 A | 4/1996 | Libman et al. |
| 6,172,640 B1 | 1/2001 | Durst et al. |

(Continued)

FOREIGN PATENT DOCUMENTS

| CN | 1740806 A | 3/2006 |
| CN | 100388558 C | 5/2008 |

(Continued)

OTHER PUBLICATIONS

CA 2871275 office action dated Mar. 21, 2016 with related claims 1-10.
(Continued)

*Primary Examiner* — Emily C Terrell
(74) *Attorney, Agent, or Firm* — Anglehart et al.

(57) ABSTRACT

An improved wearable locator has an ultra-low power RF transceiver, GPS receiver, cellular network RF transceiver, processor, programmable non-volatile memory, LCD display, accelerometer and rechargeable battery. To ensure that the locator is within a perimeter, it can cooperate with a subordinate unit that includes an ultra-low power RF transceiver, processor, power supply, DC charging output, rechargeable battery, visual, audible and tactile enunciators and pushbutton, and can be plugged into an outlet or be unplugged and be mobile. Other wireless units can be used to define a perimeter.

16 Claims, 14 Drawing Sheets

Related U.S. Application Data

(60) Provisional application No. 61/717,800, filed on Oct. 24, 2012, provisional application No. 61/637,610, filed on Apr. 24, 2012.

(51) Int. Cl.

| | |
|---|---|
| *G01S 19/48* | (2010.01) |
| *G08B 21/02* | (2006.01) |
| *G08B 21/04* | (2006.01) |
| *G01S 19/16* | (2010.01) |
| *G01S 19/17* | (2010.01) |
| *G01S 19/34* | (2010.01) |
| *G01S 1/68* | (2006.01) |
| *G01S 5/00* | (2006.01) |
| *H04W 4/021* | (2018.01) |
| *H01Q 1/40* | (2006.01) |
| *G06K 19/077* | (2006.01) |
| *H01Q 1/27* | (2006.01) |
| *H04B 1/3827* | (2015.01) |

(52) U.S. Cl.
CPC ............ *G01S 19/16* (2013.01); *G01S 19/17* (2013.01); *G01S 19/34* (2013.01); *G01S 19/48* (2013.01); *G06K 19/07762* (2013.01); *G08B 21/0211* (2013.01); *G08B 21/0261* (2013.01); *G08B 21/0277* (2013.01); *G08B 21/0286* (2013.01); *G08B 21/043* (2013.01); *G08B 21/0446* (2013.01); *G08B 21/0461* (2013.01); *G08B 21/0492* (2013.01); *H01Q 1/273* (2013.01); *H01Q 1/40* (2013.01); *H04B 1/385* (2013.01); *H04W 4/021* (2013.01); *G08B 21/0225* (2013.01); *G08B 21/0269* (2013.01); *G08B 21/0272* (2013.01); *H04B 2001/3861* (2013.01); *Y02D 70/1222* (2018.01); *Y02D 70/144* (2018.01); *Y02D 70/164* (2018.01); *Y02D 70/26* (2018.01); *Y02D 70/40* (2018.01)

(58) Field of Classification Search
CPC ............ G08B 21/0446; G08B 21/0261; G06K 19/07762; A61B 5/681; A61B 5/6828; G01S 1/68
USPC ............ 340/539.1–539.19, 4.1–4.14, 572.1, 340/573.1; 342/357.06–357.15
See application file for complete search history.

(56) References Cited

U.S. PATENT DOCUMENTS

| | | |
|---|---|---|
| 6,236,319 B1 | 5/2001 | Pitzer et al. |
| 7,492,251 B1 | 2/2009 | Katz |
| 8,090,383 B1* | 1/2012 | Emigh .................. H04M 15/00 340/932.2 |
| 2003/0169207 A1 | 9/2003 | Beigel |
| 2005/0017901 A1 | 1/2005 | Koptiev |
| 2006/0038717 A1 | 2/2006 | Uozumi |
| 2006/0267760 A1 | 11/2006 | Shecter |
| 2007/0113964 A1 | 5/2007 | Crawford et al. |
| 2007/0247359 A1* | 10/2007 | Ghazarian ............... G01S 19/34 342/357.74 |
| 2008/0004510 A1 | 1/2008 | Tanzawa et al. |
| 2010/0103037 A1 | 4/2010 | Cheng |
| 2010/0249541 A1* | 9/2010 | Geva .................. G06F 19/3418 600/301 |
| 2011/0082711 A1* | 4/2011 | Poeze ................ A61B 5/14532 705/3 |
| 2012/0185267 A1* | 7/2012 | Kamen .................. G06Q 50/22 705/2 |
| 2013/0214909 A1* | 8/2013 | Meijers ................. H04W 4/029 340/10.5 |
| 2013/0217332 A1* | 8/2013 | Altman .................. H04H 60/90 455/41.2 |
| 2013/0218583 A1* | 8/2013 | Marcolongo .......... G06F 19/00 705/2 |
| 2014/0155705 A1* | 6/2014 | Papadopoulos ......... G06F 19/00 600/301 |

FOREIGN PATENT DOCUMENTS

| | | |
|---|---|---|
| CN | 101726744 A | 6/2010 |
| EP | 1304671 A1 | 4/2003 |
| WO | WO 2006/127440 A2 | 11/2006 |

OTHER PUBLICATIONS

CA2871275 Office action dated Nov. 4, 2015 with related claims.
China application 2013800331991 office action and search report dated Jul. 5, 2016 with related claims.
EP 13782469 Supplementary European search report and search opinion dated Apr. 26, 2016 with related claims.
EP 13782469 Supplementary European search report dated Dec. 7, 2015 with related claims.
PCT/CA2013/050285 CIPO search detail.
PCT/CA2013/050285 international preliminary report dated Jul. 18, 2014.
PCT/CA2013/050285 international search report corrected on Sep. 23, 2013.
PCT/CA2013/050285 written opinion corrected on Sep. 23, 2013.
PCT/CA2013/050285 written opinion dated Jul. 29, 2013.
Australian application No. 2013252462 office action dated Jun. 30, 2016.
CA2871275 Office action dated Sep. 21, 2016 with related claims.
CA2871275 Office action dated Apr. 18, 2017 with related claims.
China application 2013800331991 office action and search report dated Mar. 7, 2017 with related claims.
EP 13782469 Office action dated Mar. 9, 2017 with related claims.

* cited by examiner

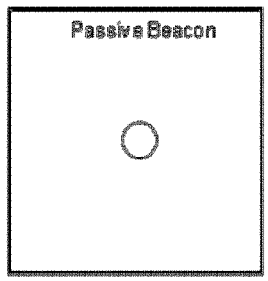 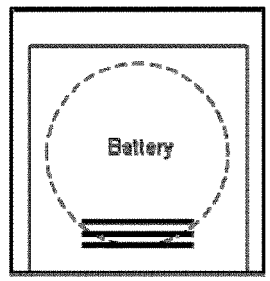 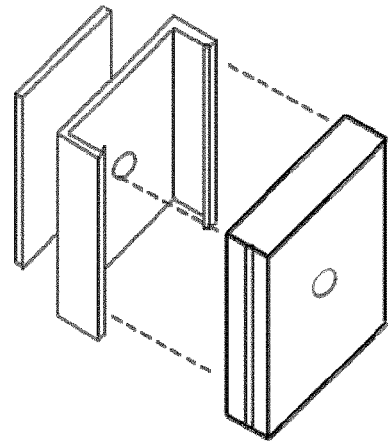
Figure 6A  Figure 6B  Figure 6C
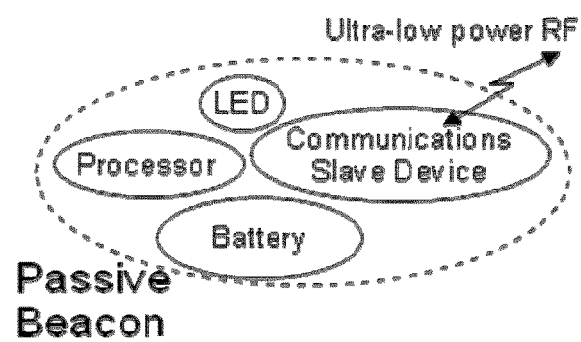
Figure 7

External housing    Electronics board    Back housing    Fasteners speaker box

APPARATUS AND METHODS FOR GEOLOCATING AN INDIVIDUAL WITH RESPECT TO A PERIMETER

TECHNICAL FIELD

This invention relates to mobility aware geolocation, and in particular to systems and methods for geolocating individuals with respect to a perimeter.

BACKGROUND

In a variety of fields, there is a growing need for monitoring and/or tracking the location of an individual. For example, such monitoring is useful in the medical care field for autistic individuals and Alzheimer's sufferers whom tend to wander outside a care facility potentially getting lost. Other fields include child care, law enforcement and geographically isolated working environments.

An attempt to address maintaining information regarding a patient's location and wellbeing is described in U.S. Pat. No. 7,825,794, entitled "Alzheimer's Patient Tracking System" which issued Nov. 2, 2010. The patient wears an electronic asset tag which has an active mode and a sleep mode. The electronic tag is kept at low power in the sleep mode to conserve power, and power is consumed by the electronic tag when the electronic tag moves out of range of an external transmitter. When the patient moves out of range of a base station for a predetermined period of time, the electronic tag switches on and begins transmitting its coordinates to a terrestrial radio network. Also described is a non-portable base station positioned at a fixed location and powered from the mains. There is no disclosure how this system operates during a power outage or power glitch, conditions which would seem to raise false alarms disabling power mode. No alarm are described to indicate that the locator has gone beyond the range of the plugged in base station.

There is a need to address outstanding issues in providing individual geolocation.

SUMMARY

The proposed solution addresses outstanding issues regarding providing individual geolocation. Without limiting the invention, individuals being tracked and/or monitored include (in no particular order): children, autistic persons, Alzheimer's sufferers, juvenile delinquents, persons under house arrest, persons of interest, unidentified persons recovering from severe trauma, persons working alone in geograpically remote locations, persons subject a restraining order, members of an endangered species, animals in natural protected habitats, animals under animal behavior studies, etc.

In accordance with an aspect of the proposed solution, an individual locator device sleep mode is activated based on proximity to low power wireless (communication) beacon. An individual locator device remains in sleep mode when the individual location device picks up a signal from at least one known beacon.

In accordance with the proposed solution, perimeter monitoring can be provided using very low power, for example by employing a communication device such as a Bluetooth version 4.0 transceiver.

In accordance with one aspect of the proposed solution there is provided an individual locator system comprising: at least one individual locator to be worn by at least one corresponding individual, said locator unit having a local wireless transceiver and a GPS receiver; a plurality of battery powered wireless beacons configured to transmit an identification signal with a predetermined signal strength and installed in different locations within an indoor or an outdoor facility for reception by said local wireless transceiver of said at least one individual locator within a designated room or area associated with said facility, said beacons being arranged within said facility such that said individual locator receives the identification signal of one or more of said beacons; and said individual locator being configured to determine its location by detecting said identification signal of said beacons and selecting as its location a location of one of said beacons, to remove power supplied to said GPS receiver when location can be determined from said beacons, and to provide power to said GPS receiver to determine location by GPS when location cannot be determined from said beacons.

In accordance with another aspect of the proposed solution there is provided an individual locator system comprising: at least one individual locator component to be worn by at least one corresponding individual, said individual locator having a local wireless transceiver and a GPS receiver; a monitoring component having a local wireless transceiver, a battery and a mains power supply; said monitoring component being configured to communicate with said individual locator over said local wireless transceiver and to provide one of: a visual and an audible warning signal at least when one of: a permitted range and location is exceeded when said monitoring component is supplied with power from the mains power supply; said monitoring component being configured to communicate with said individual locator over said local wireless transceiver in a tether monitoring mode to send a signal to said individual locator indicating that said individual locator is to tether to said monitoring component, and to provide one of: a vibratory, a visual and an audible warning signal when said permitted range is exceeded when said monitoring component is disconnected from the mains power supply; and said individual locator being configured to remove power supplied to said GPS receiver when no alert condition is detected and said monitoring component is not in said tether monitoring mode, and to provide power to said GPS receiver to determine a geolocation when in said tether monitoring mode.

In accordance with a further aspect of the proposed solution there is provided a wearable locator and communications device comprising: a main housing; at least one strap connected to the housing; and a flexible printed circuit board extending in said housing and into the strap, a portion of said flexible printed circuit board in the strap providing an antenna.

In accordance with a further aspect of the proposed solution there is provided a wearable locator and communications device comprising: a main housing; at least one strap molded to the housing and having electronic components in the strap; and a circuit board in said main housing connected to said components in the strap.

In accordance with a further aspect of the proposed solution there is provided a wearable locator and communications device comprising: a housing having a wrist or ankle side that has a central portion between first and second adjacent portions, said first and said second adjacent portions being angled or curved in a body direction from the central portion to fit over a wrist or ankle; a pair of straps connected to said first and said second adjacent portions to fasten the device to a wrist or ankle; and a flexible printed circuit board having at least three segments mounted respectively to said central portion, said first adjacent portion and said second adjacent portion.

In accordance with a further aspect of the proposed solution there is provided a wearable locator and communications device comprising: a housing having a front cover and a rear cover; a circuit board mounted in the front cover of said housing and having a speaker; and a sound box between said circuit board and said front cover enclosing the speaker on the circuit board and having a sound port in said front cover.

In accordance with a further aspect of the proposed solution there is provided a wearable locator and communications device comprising: a housing having a inner side and an outer side, the inner side to be worn against a wearer; at least one strap connected to the housing and configured to attach the device to a wearer with the inner side against a wearer; and a charging or data port located on the inner side, said port being accessible only when the device is removed from the wearer.

BRIEF DESCRIPTION OF THE DRAWINGS

The invention will be better understood by way of the following detailed description of embodiments of the invention with reference to the appended drawings, in which:

FIG. 6A is a schematic diagram illustrating a front view of a passive beacon device, in accordance with an implementation of the proposed solution;

FIG. 6B is a schematic diagram illustrating a rear view showing a relative size of the passive beacon device with respect to a button cell behind a battery door, in accordance with the implementation of the proposed solution;

FIG. 6C is a schematic diagram illustrating an exploded view of the passive beacon device and anchor components in accordance with the implementation of the proposed solution;

FIG. 7 is a schematic diagram illustrating functional components of the passive beacon device in accordance with the proposed solution;

DETAILED DESCRIPTION

In accordance with an aspect of the proposed solution, an individual locator device low power mode is activated based on proximity to low power wireless (communication) beacons defining a perimeter such as, but not limited to: a house, a garden, a place of work, etc. In accordance with an embodiment of the proposed solution, the individual location device remains in the low power mode when the individual locator device picks up a signal from at least one known beacon. When outside the perimeter, the individual locator device selectively turns on a cellular and/or a GPS receiver to determine the geolocation thereof. An alarm can be triggered, and an alarm message is sent to a monitoring station when no beacon signal is received, sending the message including transmitting the location obtained directly to a monitoring center to reduce the possibility of the individual getting lost. By remaining in low power mode while within the perimeter, the battery of the individual locator device would last significantly longer. Accordingly, the individual locator device expends little energy while within the perimeter and concentrates power use in providing geolocation when the individual is outside the perimeter.

A perimeter can be defined using one or several beacon devices at locations the individual wearing the individual locator is allowed to move between. For certainty the invention is not limited to "inside the perimeter" being understood as within a closed geometrical locus. For the purposes of this description, "inside the perimeter" corresponds to an alarm stand-down state of the individual personal locator. For example, for the purposes of enforcing a restraining order, in which a monitored person is not allowed to approach a building or a person, "inside the perimeter" is understood as the open geometrical locus outside the building or far from the person, while "outside the perimeter" is understood as the closed space within the building or too close to the person.

A perimeter can also be defined by the clear signal range of a single beacon. Again, "inside" and "outside" the perimeter respectively correspond to "allowed" and "disallowed" beacon clear signal transmission ranges.

In accordance with the proposed solution, perimeter monitoring can be provided using very low power, for example by employing communication devices such as Bluetooth version 4.0 transceivers. The use of Bluetooth 4.0 transceivers can double as short range communications transceivers exchanging signals and information with at least one sensor module configured to obtain at least one sensor value concerning the well being of the monitored individual. This exchange of signals and information can be conducted within a Personal Area Network (PAN).

Individual Monitoring System

Figure 1:
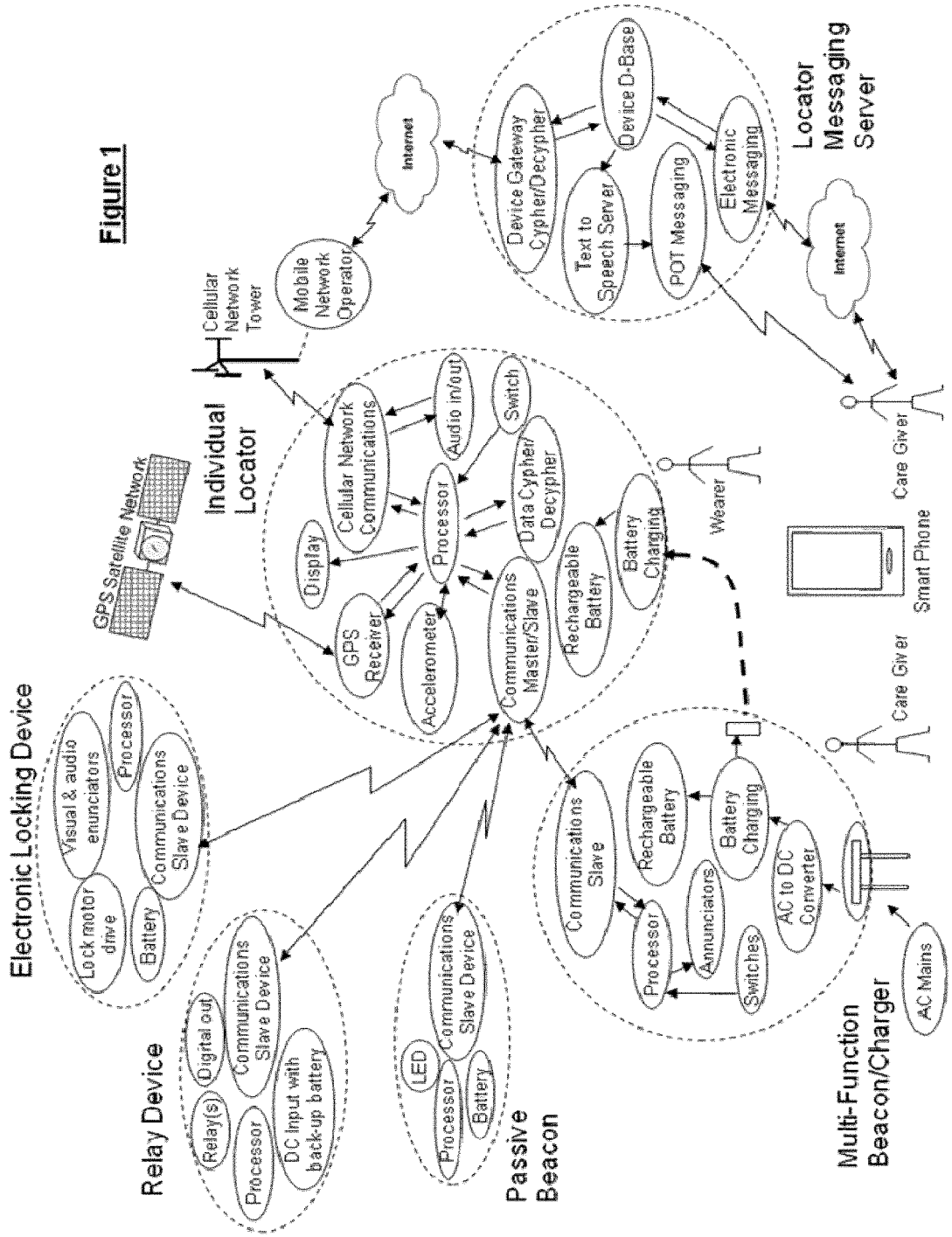
FIG. 1 is a schematic diagram illustrating an individual geolocating system for monitored individuals in accordance with a proposed solution.
Figure 3A:
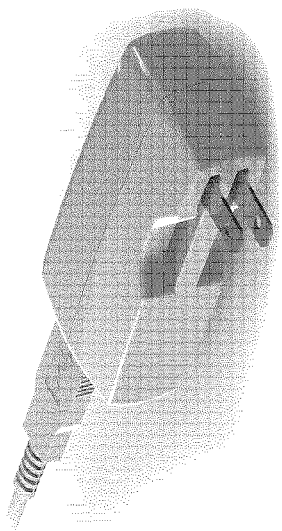
FIGS. 3A and 3B are schematic diagrams illustrating back views of the multifunction beacon respectively with deployed and retracted power prongs, in accordance with the implementation of the proposed solution.
Figure 3B:
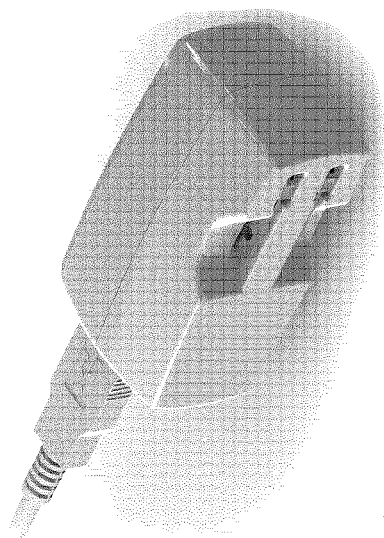

In accordance with an embodiment of the proposed solution, an individual monitoring system is illustrated in FIG. 1 and includes beacons and the individual locator device. At least two types of beacons can be implemented without limiting the invention thereto.

In accordance with the proposed solution, the personal locator device is the focal point of the proposed solution. The individual locator device which acts as a master component with respect to communications and data relay to a monitoring station exemplified by a locator messaging server in FIG. 1. From a communications point of view, the individual locator device is configured to interface wirelessly with compatible communication devices, including devices having device types mentioned herein. When the individual locator device and one of device types are within a transmit distance, communications are established in accordance with device type ID's wherein the device types are slave components with respect to such established communications. Communications slave component device types can communicate location information to the individual locator device (the individual locator device subsequently passes this information to server and care givers) and/or activate or deactivate other monitoring and security related functions. The individual locator device obtains and communicates geolocation information periodically to the monitoring station according to pre-defined individual locator device configuration parameters, on request from care givers and/or monitoring service(s)/station(s), or event driven whenever an alert condition occurs. Geolocation information can be retrieved from the either of the closest beacon device, the Global Positioning Satellite (GPS) network or the public cellular network (Assisted-GPS). Geolocation and alert information is communicated to the location messaging server via a public cellular network for data storage and relay to care givers and/or other alarm monitoring services by using a electronic communication methods.

Device types participating in the individual monitoring system include, but are not limited to: portable multifunction beacons, passive beacons, proximity beacons, relay devices, stand-alone electronic locking devices, motion detectors, video surveillance cameras, etc. Each of these devices include a unique device type identifier which according to end user parameters may or may not cause the individual locator device to switch between the low power mode and the master mode. Each device type can implement Bluetooth 4.0 communications and can be assigned a textual name and/or geo-location coordinates which can be conveyed to the individual locator to provide more precise location information when GPS geo-location is not available or of insufficient accuracy. For example, insufficient accuracy can be defined as a geopositioning error larger than the monitored perimeter.

Without limiting the invention, examples of beacon device types include:

Passive Beacon

In accordance with an embodiment of the proposed solution, FIGS. 6A, 6B, 6C and 7 illustrate aspects of a passive beacon configured to transmit a beacon signal containing at least a passive beacon IDentification (ID). The passive beacon device is preferably inexpensive, easily installed using commonly available tools, small in size about the size of a large postage stamp and fully self-contained. FIG. 6C illustrates a mounting bracket and/or double-sided self-adhesive tape being employed for installation thereof. In some implementations the passive beacon device is water resistant.

In some embodiments, the passive beacon also transmits a device type ID. In yet other embodiments, the passive beacon is programmable during manufacture and/or in the field to provide a geolocation including a fully qualified global position, address or location within a building. Employing Bluetooth 4.0 provides both a low power beacon wireless signal within a range, as well minimizes the number of communication components for individual monitoring system features described herein.

Figure 8:
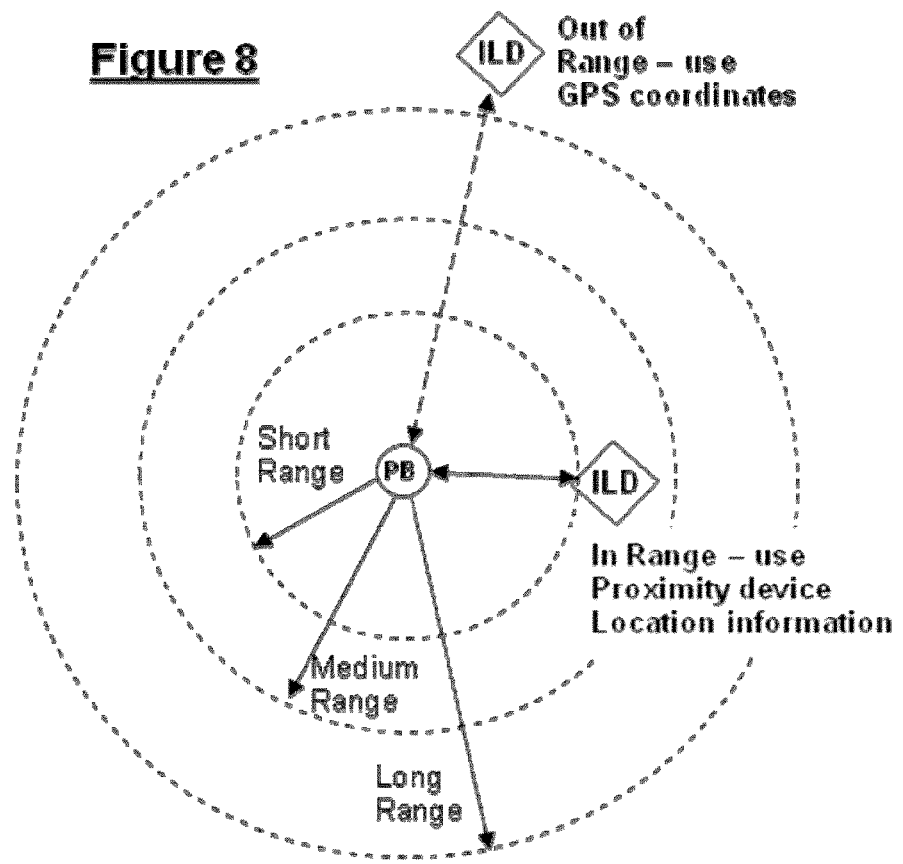
FIG. 8 is a schematic diagram illustrating wireless communication range selection between the passive beacon and the individual locator device in accordance with the proposed solution.

In accordance with an implementation of the proposed solution, the passive beacon provides location information when in transmission range of the individual locator device. The transmission range of the passive beacon device can be user selectable in the field between low, medium and long. With reference to FIG. 8, the passive beacon can be programmed to transmit an RF signal at one of multiple power levels resulting in a corresponding variable wireless communication range that can be adjusted depending on deployment. When within communication range of a passive beacon and according to pre-determined parameters such as, but not limited to, beacon type ID, the individual locator device operates and remains in a low power mode. While FIG. 8 illustrates setting the transmit power level to one of high, medium or low range, it is understood that transmit power can be set to other fixed or continuously variable transmit levels depending on the particular monitoring deployment.

With reference to FIG. 7, a low power passive beacon is provided and includes a housing, a power source, electronic circuit board and a Bluetooth 4.0 transmitter.

In some implementations, the power source is a user replaceable battery. Preferably, the power source is a button type battery cell, either of a single use type or rechargeable type. Preferably a lithium button cell is employed, capable of providing power for multiple years of operation. Other button cell battery types may also be used such as NiCd or NiMH. Depending on implementation, batteries may need to be removed and recharged periodically using commercially available battery chargers.

The button type battery cell power source operationally coupled to the Bluetooth 4.0 transmitter can preferably be enclosed within a housing which is unobtrusive, robust and of reduced dimensions and which can be permanently fastened. For example, the passive beacon is an envelope stamp sized device configured to be adhered to a wall or ceiling surface. As another example, the passive beacon is permanently anchored to a structural object with an appropriate anchor, for example a wall anchor such as, but not limited to a rivet. For certainly, the invention is not limited to a flat passive beacon.

In other implementations, the passive beacon includes a low battery indicator such as a Light Emitting Diode (LED).

In some implementations, for example ones in which the passive beacons are not programmable, the Bluetooth 4.0 transmitter need not be part of a full transceiver reducing size and power requirements. Conversely in other implementations, for example ones in which the passive beacons are programmable, a full Bluetooth 4.0 transceiver is employed.

The Bluetooth 4.0 transceiver of the passive beacon is configured as a slave Bluetooth communications component and is generally discoverable by a master Bluetooth communication component of an individual locator device. In accordance with one implementation, the master individual locator device is configured to listen to one or more beacons at a repetition rate, and read at least one of: a beacon ID, a beacon device type ID, a location ID, geolocation, a monitored individual ID, etc. In other implementations, the passive beacon can also be configured to periodically transmit providing at least one of: a beacon ID, a beacon device type ID, a location ID, geolocation, a monitored individual ID, etc. When exclusively providing a unique beacon ID or unique beacon device type ID the passive beacon need not be programmable and the passive beacon can be set at manufacture to transmit the unique ID. The unique beacon ID can be a unique Media Access Control (MAC) address which can simplify unique beacon ID validation as explained herein below.

A beacon processor interfaces to the wireless Bluetooth 4.0 communications slave circuit which is set by the processor to be generally discoverable by one or more individual locator device. Wireless data communication is secured through the application of an encryption engine, for example, 128 bit AES encryption can be employed.

The passive beacon can be programmed with location information including at least one of: alphanumeric text for example "Apt. 403", "mobile beacon installation", GPS longitude and latitude coordinates, etc.; such programmed information is communicated to an individual locator device when needed. The passive beacon can be programmed by an end user using a device compatible with the Bluetooth 4.0 communications transceiver; such an end user using a device includes a compatible wireless communications transceiver, such as a computer or smart phone.

Being inconspicuous and of low cost, these passive beacon devices can be installed in numerous locations and in some implementations can be programmed with location information and set of ranges using a portable device such as a smart phone incorporating a compatible wireless transceiver including but not limited to Bluetooth 4.0 and passive beacon programming software.

Relay Device

With reference to FIG. 1, a relay device provides hard electrical contacts responsive to, and optionally digital outputs indicating, the proximity of an individual locator device and is programmed to initiate certain actions. For this purpose, the relay device requires a Bluetooth 4.0 receiver. The outputs can be used to control other devices such as automatic door openers, lights and/or security systems. The transmission range of the relay device can be user selectable between low, medium and long range. In some implementations, the relay device is a subtype of the passive beacon device described herein providing location information to an individual location device when in range of the individual locator device. Employing Bluetooth 4.0 provides both a low power beacon wireless signal within a range, as well minimizes the number of communication components for individual monitoring system features described herein.

For example, a relay beacon can activate a relay contact disabling an automatic door from opening for stopping an Alzheimer's patient from leaving the premises.

Reed Switch Device

A reed switch device provides hard electrical contacts responsive to, and optionally a digital output indicating the proximity of an individual locator device and is programmed to initiate certain actions when the reed switch state changes. For this purpose, the reed switch device requires a Bluetooth 4.0 receiver. The output can be used to control other devices such as lights and/or security systems. The transmission range of the reed switch device can be user selectable between low, medium and long range. In some implementations, the reed switch device is a subtype of the passive beacon device described herein providing location information to an individual location device when in range of the individual locator device. Employing Bluetooth 4.0 provides both a low power beacon wireless signal within a range, as well minimizes the number of communication components for individual monitoring system features described herein.

For example, a reed switch beacon affixed to a door jamb can operate as a passive beacon until the door having a corresponding magnet attached to it is opened. Once the door is opened the reed switch closes a contact or a digital output turns on lights or raises a security system alarm (silent or not). Without limiting the invention, the raised alarm can be used to (automatically) trigger a geolocation query (and alert) from the monitoring station via long distance communications (SMS/GSM).

Electronic Locking Devices

With reference to FIG. 1, an electronic locking device can be a subtype of a relay device which can be programmed to automatically unlock whenever the individual locator device identification information corresponds to identification information pre-programmed into the electronic locking device. The transmission range of the electronic locking device can be user selectable between low, medium and long range. In some implementations, the electronic locking device is a subtype of the relay device described herein providing location information to an individual location device when in range of the individual locator device. Employing Bluetooth 4.0 provides both a low power beacon wireless signal within a range, as well minimizes the number of communication components for individual monitoring system features described herein.

Security System Interworking

With reference to FIG. 1, a passive beacon device can be implemented in a motion detector or (video) surveillance camera (not shown) typically employed in residential or commercial building security. The transmission range of the motion detector or surveillance camera passive beacon device can be user selectable between low, medium and long range, providing location information to an individual location device when in range of the motion detector or surveillance camera. Employing Bluetooth 4.0 provides both a low power beacon wireless signal within a range, as well minimizes the number of communication components for individual monitoring system features described herein. When implemented in a motion detector or surveillance camera, power requirements of the passive beacon device can be relaxed.

In accordance with one implementation, a relay device is implemented in a motion detector and the output of the relay device can be used, via the security system, to implement further functionality including complementing the functionality provided by the individual locator system. In accordance with another implementation, a relay device is implemented in a surveillance camera and the output of the relay device can be used for example to change the activation state of the surveillance camera and/or signal the security system to implement further functionality including complementing the functionality provided by the individual locator system.

Multifunction Beacon Device

In accordance with an embodiment of the proposed solution, a multifunction beacon device can be implemented for example in a multifunction charger illustrated in FIGS. 2, 3A, 3B and 4 used for charging an individual locator device. The multifunction beacon includes: a housing, a rechargeable power source, at least one enunciator, a Bluetooth 4.0 transceiver having a transmitter and receiver, and a beacon processor executing logic instructions at least for selectively providing a visual, an audible and/or a vibratory enunciation when the individual locator device moves beyond Bluetooth communication range. The multifunction beacon is configured to transmit a beacon signal containing at least one of: a beacon IDentification (ID), device type ID, a location ID, geolocation, a monitored individual ID, etc.

The multifunction beacon is programmable to provide, at least in a docked mode, a geolocation including a fully qualified global position, address or location within a building. The multifunction beacon stores location information including at least one of: alphanumeric text for example "Apt. 403", "mobile beacon", GPS longitude and latitude coordinates, etc. programmed by the end user for example using a device compatible with the Bluetooth 4.0 communications transceiver, such programmed information is communicated to an individual locator device when needed. Wireless data communication is secured through the use of an encryption engine. Employing Bluetooth 4.0 provides both a low power beacon wireless signal within a range, as well minimizes the number of communication components for individual monitoring system features described herein.

The multifunction beacon housing has features enabling handheld use, preferably including a status interface and an interactive interface. The multifunction beacon can be pocket sized. The housing can also include an eyelet, not shown, for attaching a lanyard, strap, carabiner, etc.

The status interface can include a Light Emitting Diode (LED) and/or a display. The interactive interface can include at least one button or a keyboard/keypad. For certainty, the interactive interface is not strictly required, the multifunction beacon can be configured for interaction therewith via the Bluetooth 4.0 transmitter, for example a Bluetooth keyboard can be employed or a minder (person, nurse, guard, inspector) can interact with the multifunction beacon via a smart phone, tablet, portable computer, or the like. The enunciator can include an auditory, visual and/or vibratory transducer to raise an alarm and/or complement the interactive interface.

The multifunction beacon includes wall plug Alternating Current (AC) power prongs for plugging the multifunction beacon into a power receptacle. The power prongs can be foldable allowing for convenient carrying the multifunction beacon in a pocket or purse. The wall plug can be a serviceable part configurable for different power receptacles around the World. An LED can be employed providing visual enunciation on the face of the unit housing, for example should the individual locator device stray beyond the monitored perimeter.

Figure 2:
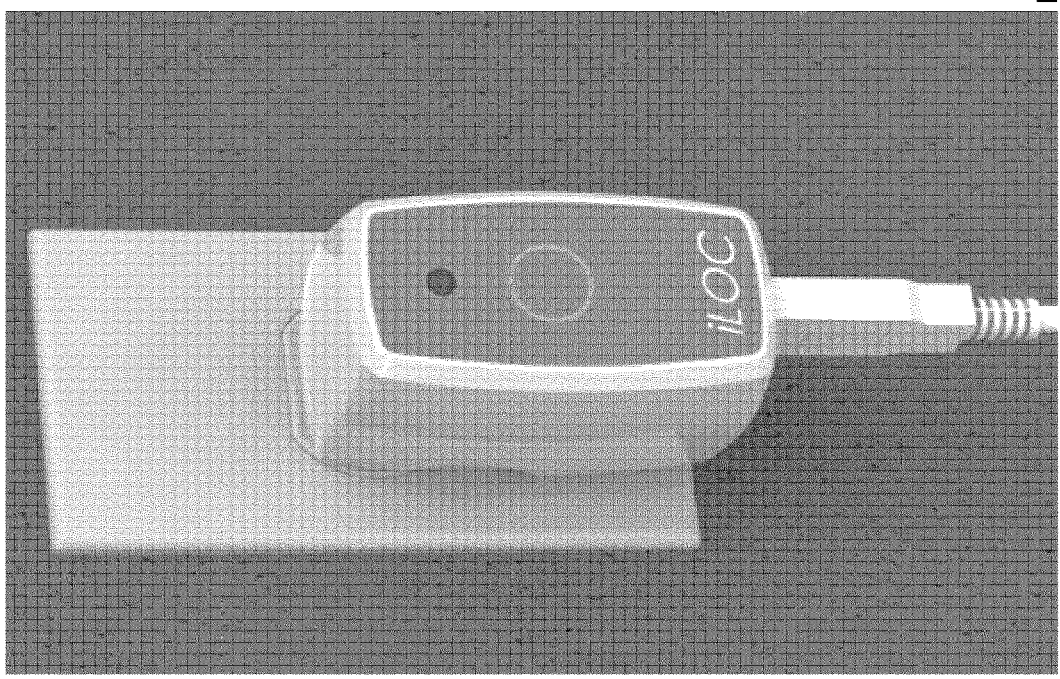
FIG. 2 is a schematic diagram illustrating a front view of a multifunctional beacon in accordance with an implementation of the proposed solution.
Figure 4:
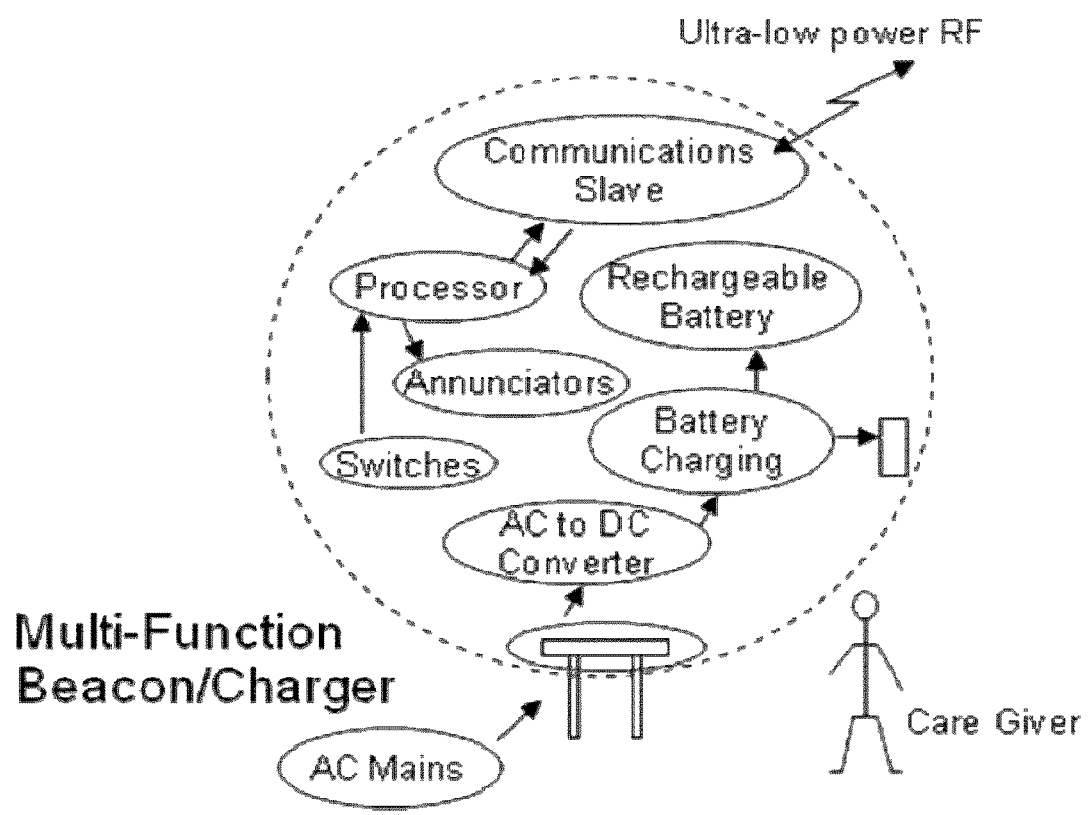
FIG. 4 is a schematic diagram illustrating a multifunction beacon device in accordance with the proposed solution.

In accordance with the specific implementation of the housing of the multifunction beacon illustrated in FIGS. 2 and 3, a Direct Current (DC) output connector provides a physical connection to an individual locator device, for example for charging purposes. While a Universal Serial Bus (USB) type connector is illustrated in FIGS. 2 and 3, it is understood that other suitable connectors could also be employed for such purpose.

In accordance with an implementation of the proposed solution, the multifunction beacon device is normally powered by from AC mains and incorporates a rechargeable power source enabling a minder to unplug the multifunction beacon device from the AC mains power to carry thereof, for example in a pocket, in a purse or around the neck. The rechargeable power source of the multifunction beacon can include a Lithium Ion battery providing flexible recharge at reasonable cost. Various recharge aspects can be accounted for depending on the implementation and use scenario of the multifunction beacon. The LED can also provide a status indication, for example a battery status.

The multifunction beacon device includes an AC to DC power conversion circuit which provides regulated DC power for charging of the internal rechargeable battery, for powering the beacon processor and Bluetooth 4.0 transceiver and for charging of an externally connected individual locator device.

In some implementations a button is provided on the housing of the multifunction beacon, the button serves multiple functions, for example based on pre-determined activation sequences and durations detected by the beacon processor, for example to temporality silence enunciators or set the multifunction beacon into a programming mode for programming location information therein.

The multifunction beacon can be configured to expend about the same power as a passive beacon while it participates in defining the perimeter, in some implementations even while it is plugged into a power receptacle. As described herein, the multifunction beacon can change its transmission range parameters automatically when its state changes from AC powered (plugged) to battery powered (unplugged), functionality also referred to as beacon autoranging.

Without limiting the invention, typical power requirements while docked or plugged-in can vary between full power for example when interacted with and intermediate power.

Docked Mode

In accordance with the embodiment of the proposed solution, the multifunction beacon is operable in a docked mode. In docked mode, the multifunction beacon is typically placed in a recharging dock (not shown) and/or is plugged in connected to AC mains and typically operates as a passive beacon. In accordance with a preferred implementation of the embodiment of the proposed solution, in docked mode the multifunction beacon operates its Bluetooth 4.0 communications transceiver at high power. For this purpose, the beacon processor is configured to monitor availability of AC mains power and to command the Bluetooth 4.0 transceiver to increase transmit power when plugged in. In accordance with a preferred implementation illustrated in FIGS. 1, 2, 3A and 3B the multifunction beacon includes a wall plug for insertion directly into a power receptacle in docked mode without using an actual physical dock.

In docked mode, the multifunctional beacon can be interacted with (communications slave) on an as needed basis, for a variety of purposes described hereinbelow. It is not required that the multifunction beacon operate with reduced functionality in docked mode, besides providing a programmed information at the repetition rate much like passive beacons, the multifunction beacon can also output a status. For example the status can be visual and/or auditory, either continuous or intermittent.

When connected to AC mains power, the beacon processor is configured to command the Bluetooth 4.0 slave communication transceiver to be generally discoverable by a master individual locator and to transmit at high power level resulting in a longer communication range. In accordance with an implementation of the proposed solution, the multifunctional beacon can selectively operate as an active beacon even when docked.

In accordance with another embodiment of the proposed solution, the multifunction beacon implemented as logic instruction executed by of is one of: a smart phone, a tablet, a pocket computer, a portable computer, etc. In this embodiment the multifunctional beacon need not include AC to DC power conversion, battery recharging, or individual locator charging.

In accordance with a further implementation of the proposed solution, the multifunction beacon is configured to provide passive beacon detection, identification, registration and programming.

Figure 5:
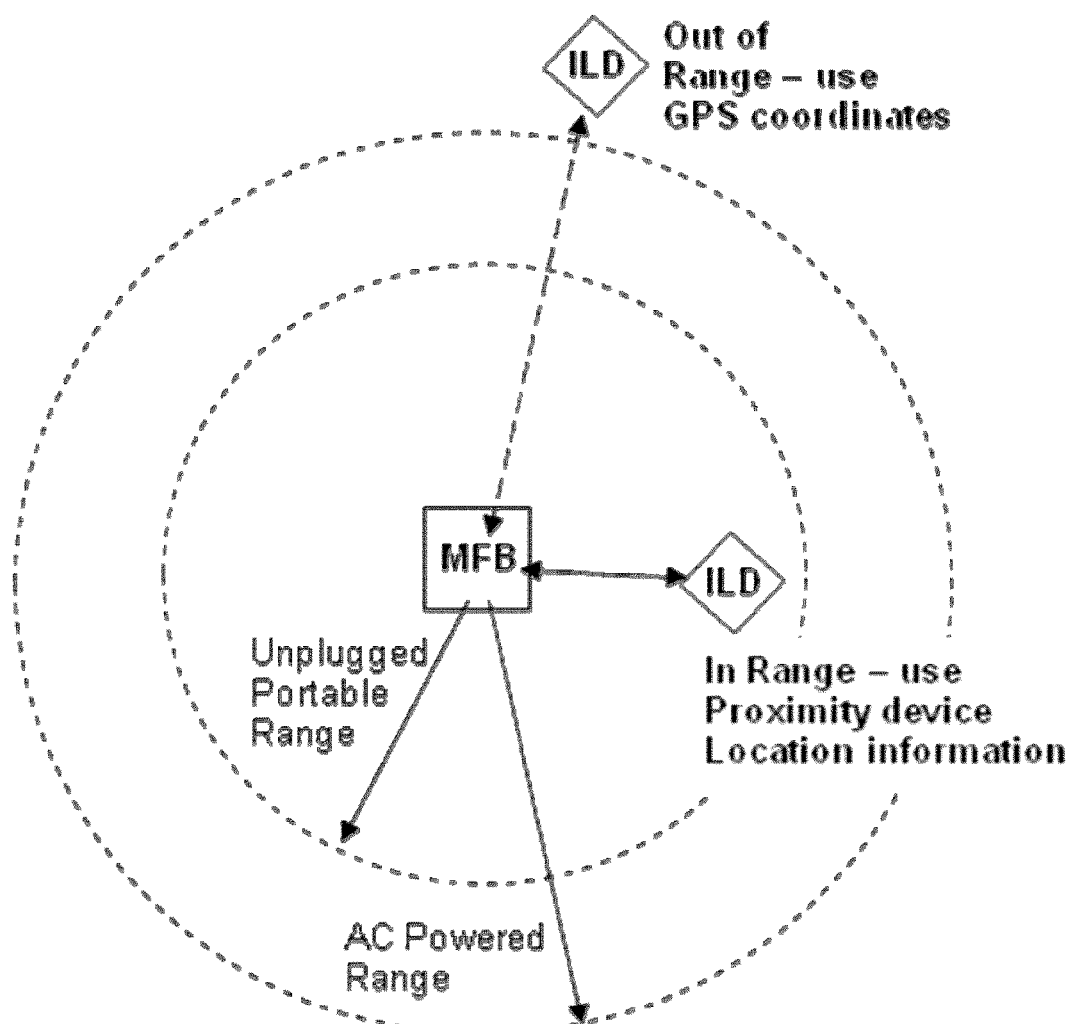
FIG. 5 is a schematic diagram illustrating multiple wireless communication ranges between the multifunction beacon and the individual locator device selected depending on AC or battery powered status of the multifunction beacon in accordance with the proposed solution.

In accordance with yet another embodiment, the multifunctional beacon processor implements functionality including individual locator activation, configuration and programming thereof, preferably with enhanced security, more preferably with access vetted by monitoring station.
Monitoring Mode Once undocked, either by removal from the recharging dock or by unplugging, the multifunction beacon operates in a monitoring mode selectively at an intermediate power by default to extend long term use thereof and at full power at least when interacted with. The beacon processor is configured to monitor the availability of AC mains power and to command the Bluetooth 4.0 communications circuit to reduce its output transmit power when unplugged, resulting in a reduced wireless communication range for portable applications, as illustrated in FIG. 5.

In accordance with the embodiment of the proposed solution, in monitoring mode the multifunctional beacon operates as an active beacon. In accordance with an implementation of the embodiment of the proposed solution, in monitoring mode the multifunction beacon identifies itself as an active beacon. For example, the beacon processor detects loss of AC mains power and configures the location information broadcast by the multifunction beacon to output "mobile beacon", and/or the beacon device type ID can specify an active beacon ID or a mobile beacon ID.

In accordance with the embodiment of the proposed solution, in monitoring mode the multifunction beacon can be configured to provide feedback. Such feedback can be provided responsive to significant events or continuously at a low repetition rate to reduce power use.

Figure 12:
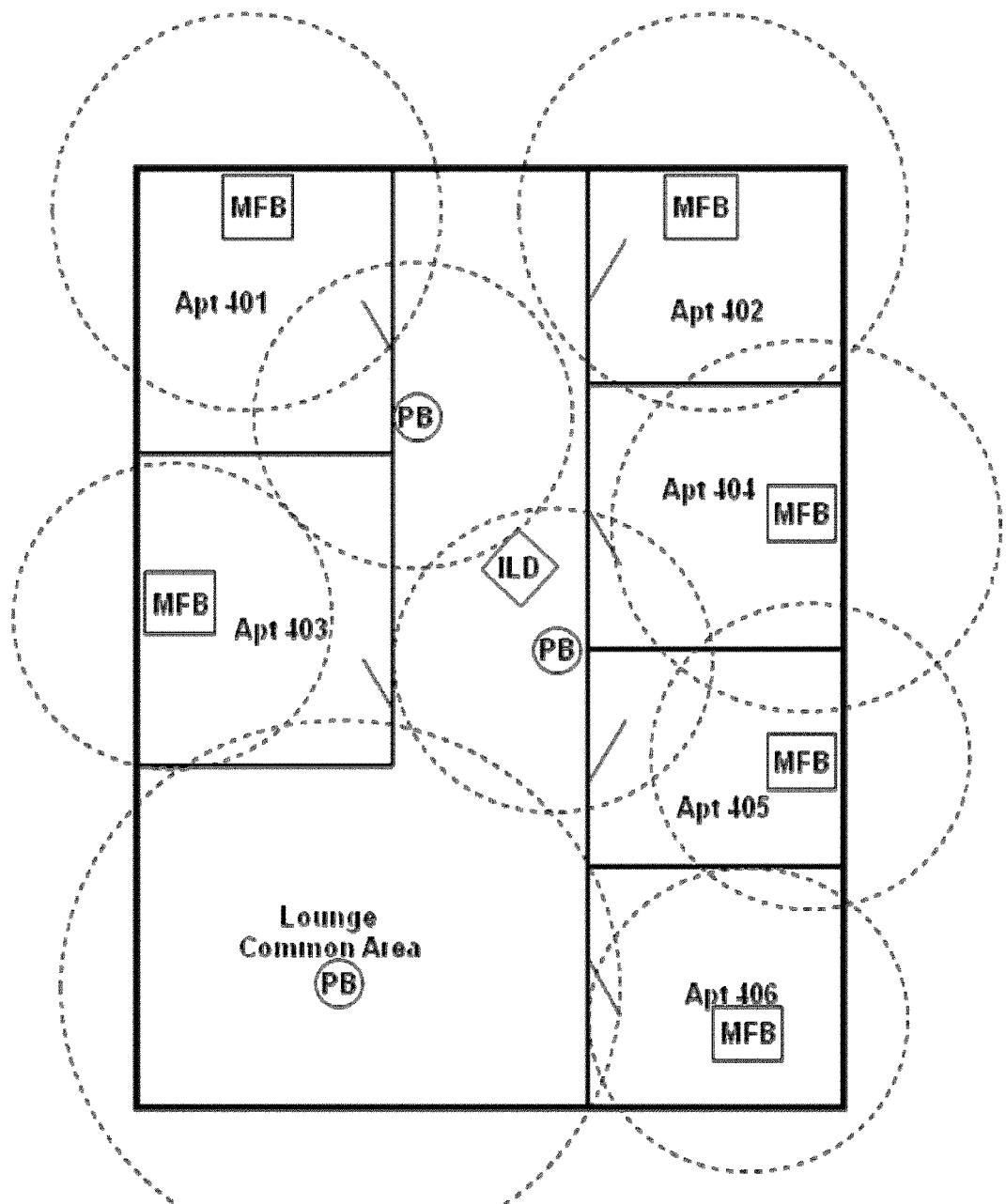
FIG. 12 is a schematic diagram illustrating a sample deployment of the proposed solution on a building floor.

The beacon processor monitors the tether status from one or more individual locator devices and controls visual, audible and vibratory enunciators according to the tether status alerting a care giver of a elopement condition whenever the monitored individual locator is out of communications range of the multifunction beacon. The vibratory enunciator provides a vibration alert only when unplugged from the AC line power.
Sample Deployment FIG. 12 illustrates a sample deployment of the proposed solution in a building configured for a supervised common living arrangement. The Individual Locator Device (ILD) is used with Passive Beacon (PB) and MultiFunction Beacons (MFB). Location of the beacons corresponds to the architectural aspects of the building providing the common living arrangement. A multifunction beacon is provided for each person supervised and typically a corresponding multifunction beacon is located in each personal living quarter. Passive beacons are typically employed in common areas such as a hallway or a lounge. For low power mode operation of individual locator devices and for providing location information when indoors, multiple beacon devices are employed with a deployment density and corresponding passive beacon transmit power settings. Passive beacons would typically have a higher density in hallways and transmit at relatively lower powers, while passive beacons would have lower densities in larger common rooms such as a lounge but transmit at higher power.
Individual Locator In accordance with the embodiment of the proposed solution, the individual locator for example illustrated in FIG. 10 includes: a housing; rechargeable power storage; optionally persistent data storage for example including programmable non-volatile memory; locator processor executing logic instructions; and preferably individually activatable short range communications Bluetooth 4.0 receiver and ultra-low power Bluetooth 4.0 transmitter, Global Positioning System (GPS) component, and long range communications transceiver component. The primary function of the individual locator is to communicate geolocation and/or alert status to care givers or monitoring services.

Figure 9A:
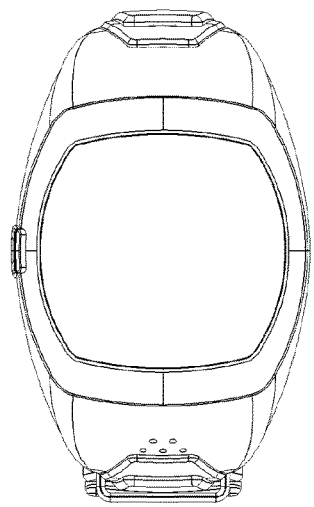
FIG. 9A is a schematic diagram illustrating front view of a an individual locator device in accordance with a specific implementation of the proposed solution.

Depending on the particular use scenario in which the individual locator is employed, the housing can have a number of features. Preferably the individual locator is ergonomic, discrete, and waterproof (to 10 ft or 3 m). Preferably the housing has a wristwatch overall appearance as illustrated in FIGS. 9A to 9K including adjustable resilient strap (wristband) with a self closable clasp:

FIG. 9A illustrates a front view of the individual locator device having a beveled surface surrounding a lens. For example, as also illustrated in FIGS. 9C, 9D and 9E, the beveled surface can have a polished diamond finish with a satin finish beyond the edge of the beveled area to reduce the perceived overall size. The lens has a shape matching the contour lines of a top external housing assembly and can be ultrasonically welded to the front housing cover to provide a waterproof seal. Also illustrated in the front view are speaker openings located facing the wearer of the individual locator device to improve perceived audio quality and sound pressure level (SPL).

Figure 9B:
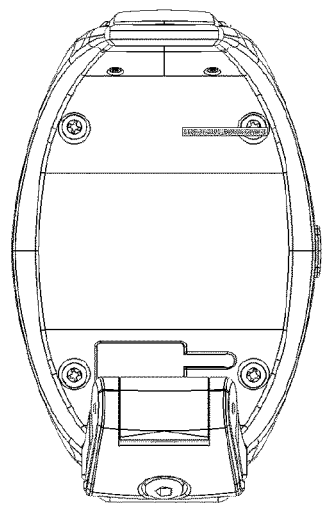
FIG. 9B is a schematic diagram illustrating back view of the individual locator device of FIG. 9A in accordance with the specific implementation of the proposed solution.
Figure 9C:
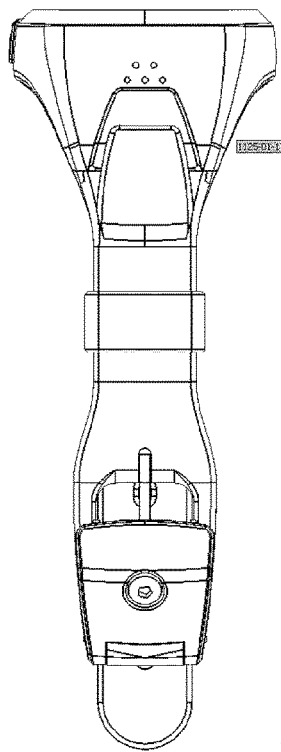
FIGS. 9C and 9D are schematic diagrams respectively illustrating left and right views of the individual locator device of FIG. 9A in accordance with the specific implementation of the proposed solution.
Figure 9D:
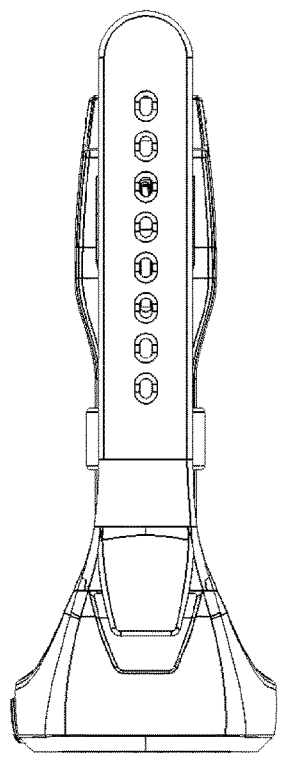
Figure 9E:
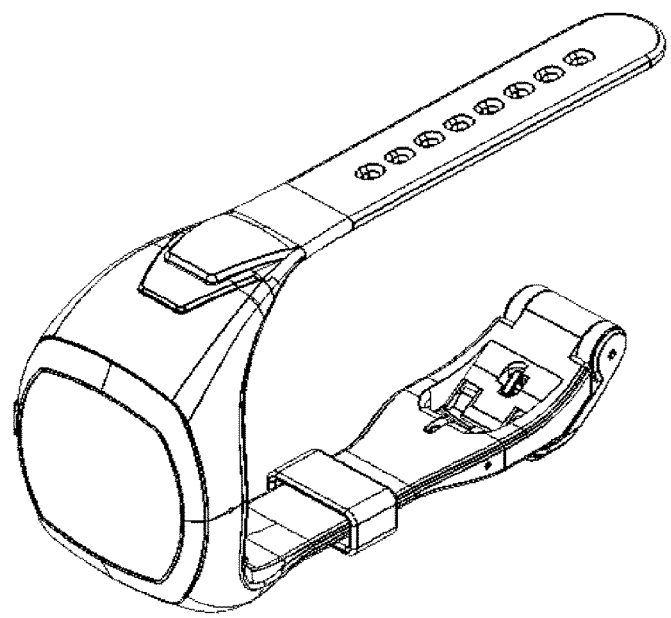
FIG. 9E is a schematic diagram illustrating a perspective view of the individual locator device of FIG. 9A in accordance with the specific implementation of the proposed solution.

FIG. 9B illustrates a rear cover of the individual locator. A USB connector is over-molded with a polymer cover to seal the connector against water, dust and dirt ingress. In particular, the USB connector is located on the underside of the individual locator device requiring removal of the device to charge the rechargeable battery for example reducing the possibility of injury to the person.

Figure 9F:
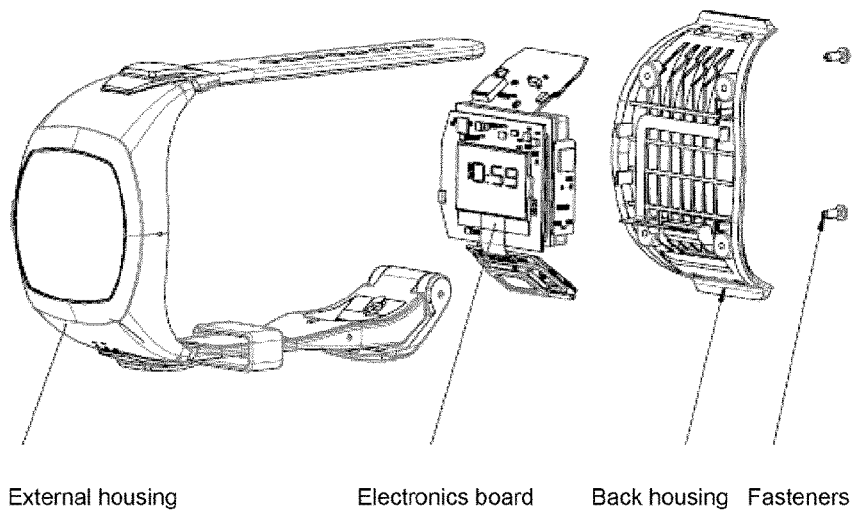
FIG. 9F is a schematic diagram illustrating a breakout view of the main housing locator device of FIG. 9E in accordance with the specific implementation of the proposed solution.

FIG. 9F illustrates a breakout view of the housing of the individual locator incorporating a main electronic assembly. The main electronic assembly includes flex circuit board for example with four rigid circuit sub-assemblies shaped to mate mechanically with interior contours of the housing assembly including the front cover and rear cover, and incorporating structural features (ribs, spines, etc.) to reduce mechanical torsion and flexion to improve the waterproofing of the housing. The rear cover includes a USB flex circuit and connector used for charging the individual locating device as mentioned herein above. While FIG. 9F illustrates screw type fasteners, the invention is not intended to being limited thereto.

Figure 9G:
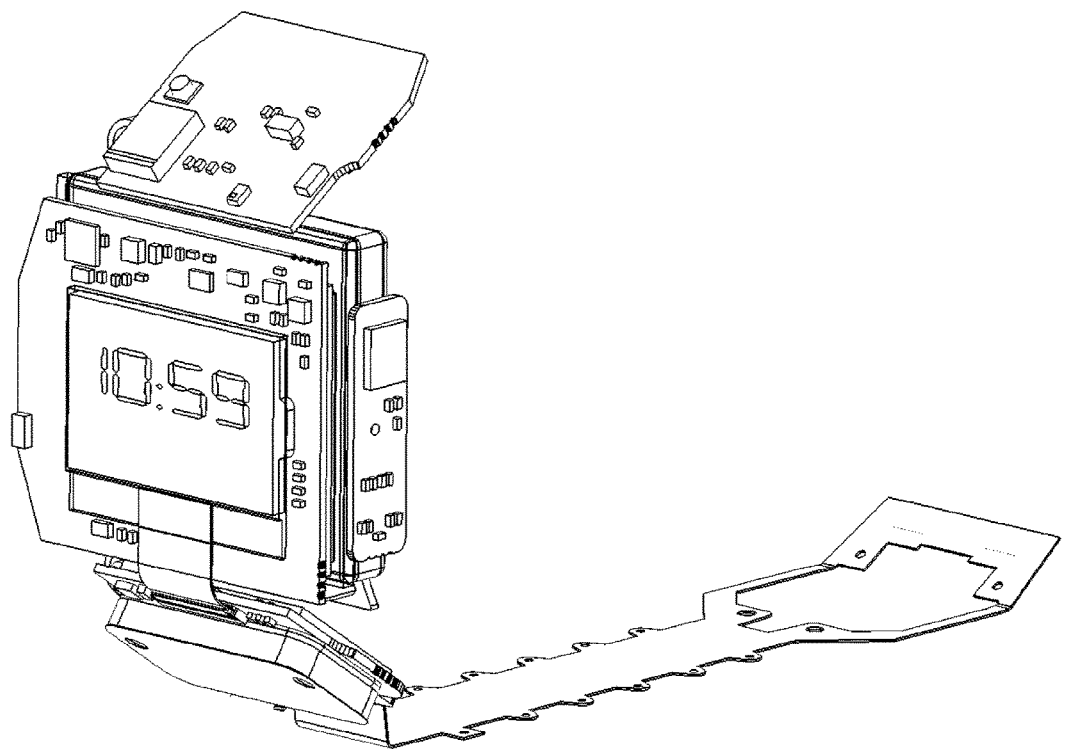
FIGS. 9G and 9H are schematic diagrams respectively illustrating front perspective and back perspective views of electronics assembly of the individual locator device of FIG. 9E in accordance with the specific implementation of the proposed solution.
Figure 9H:
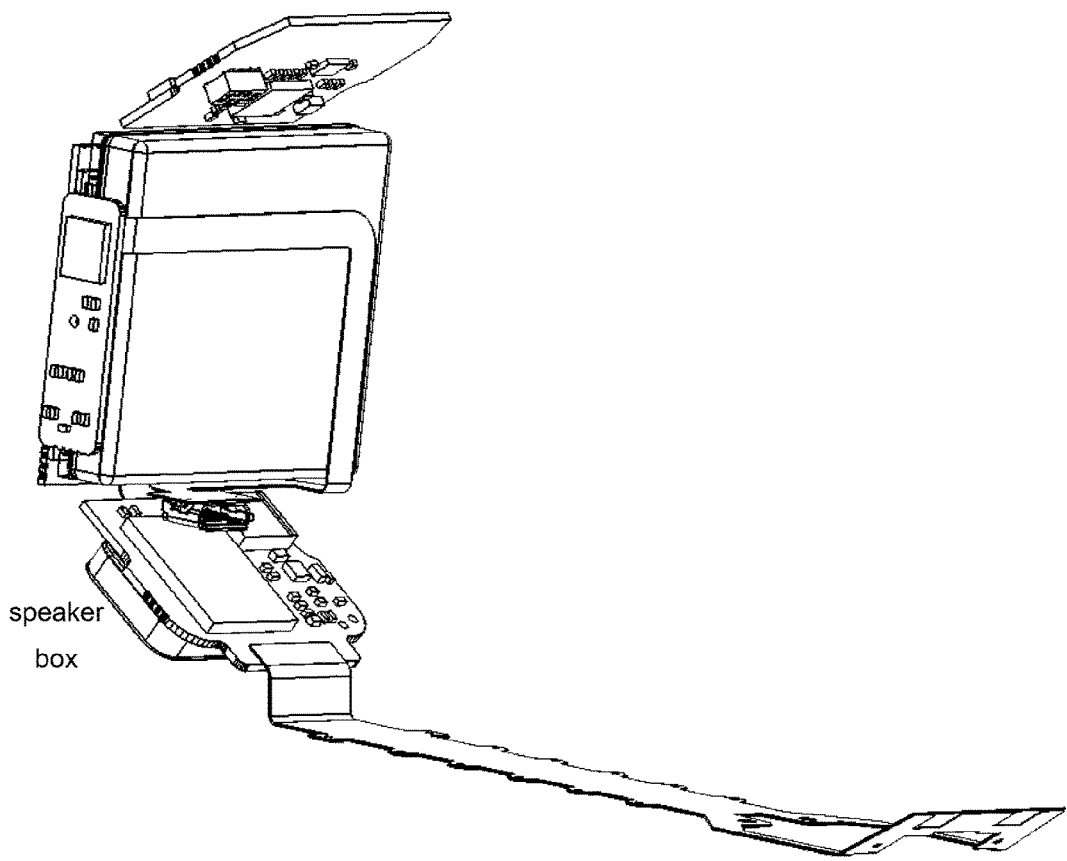

FIGS. 9G and 9H illustrate assembled electrical components of the personal locator of FIG. 9E including the main circuit board, microphone circuit board and an antenna ground extension with clasp position detection circuit.

As illustrated in FIGS. 9G and 9H, the microphone circuit board is turned upright with respect to the main circuit board, the microphone using a side port on the housing to receive an auditory signal. For example, the side port can include an orifice through the personal locator housing preferably covered on the inside of the housing by a waterproof/breathable fabric. Without limiting the invention, the waterproof/breathable fabric includes a Gore-Tex™ membrane (Gore-Tex is a registered trademark of W. L. Gore and Associates).

Figure 9I:
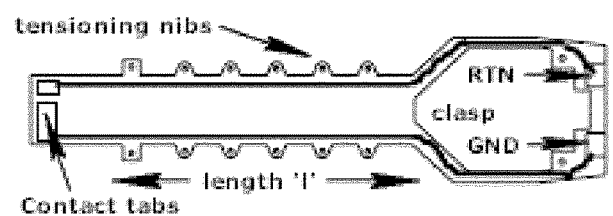
FIG. 9I is a schematic diagram illustrating a top view of an antenna detail locator device of FIG. 9E in accordance with the specific implementation of the proposed solution.

FIG. 9I illustrates an antenna ground extension and clasp position detection flexible circuit board detail. The antenna ground extension having a specified length 'l' which enhances the efficiency of the multi-band cellular antenna while providing the ground return for the clasp position detection circuit. Solder tabs are provided on the antenna ground extension flexible circuit for electrical connection to the main electronics board assembly. Tensioning nibs are provided for positioning and tensioning the antenna ground extension flexible circuit board for during polymer overmolding process.

For very high security applications, at least the strap can include features attesting to the band's integrity. For example, via ground and return leads of the clasp position detection circuit, the locator processor can test electrical continuity through the clasp. Other arrangements can be employed wherein the locator processor tests electrical conductivity through both straps. For certainty, unexpected opening of the clasp or tampering with the wristband fully activates the individual locator in a master mode culminating at least in actively tracking and transmitting the individual locator's geolocation over a cellular or satellite communications network to a monitoring station.

Figure 9J:
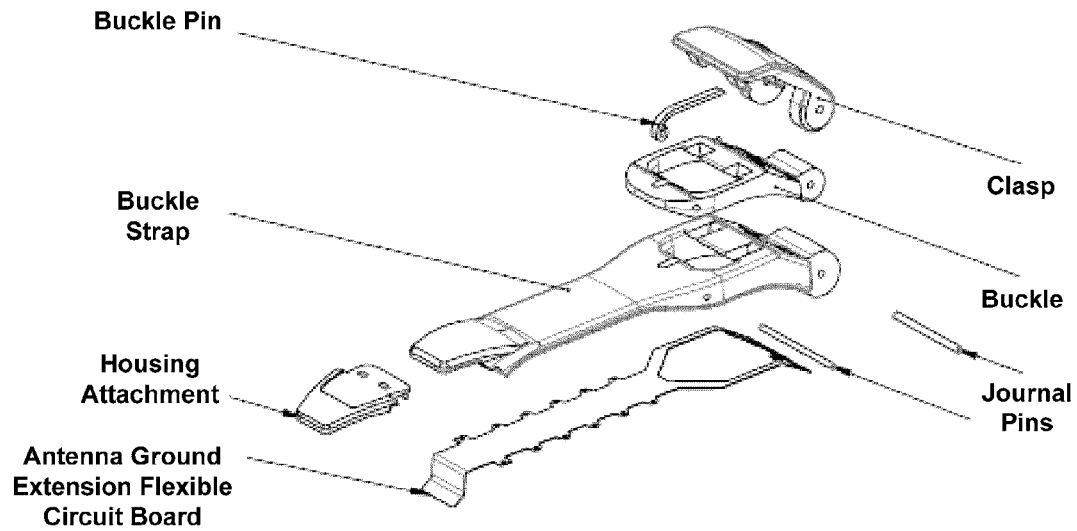
FIG. 9J is a schematic diagram illustrating a breakout view of an antenna incorporated in to a strap of the locator device of FIG. 9E in accordance with the specific implementation of the proposed solution.

FIG. 9J further illustrates the buckle strap assembly comprising the antenna ground extension flexible circuit board also providing clasp position detection. This flex board assembly is over-molded directly into the polymer strap providing a waterproof seal and a level of tamper proofing. A clasp and a buckle pin cooperate to provide mechanical fastening between the straps. The clasp and buckle pins journal on journal pins. Without limiting the invention, a housing attachment element is used in attaching the buckle strap to the front cover of the housing.

Figure 9K:
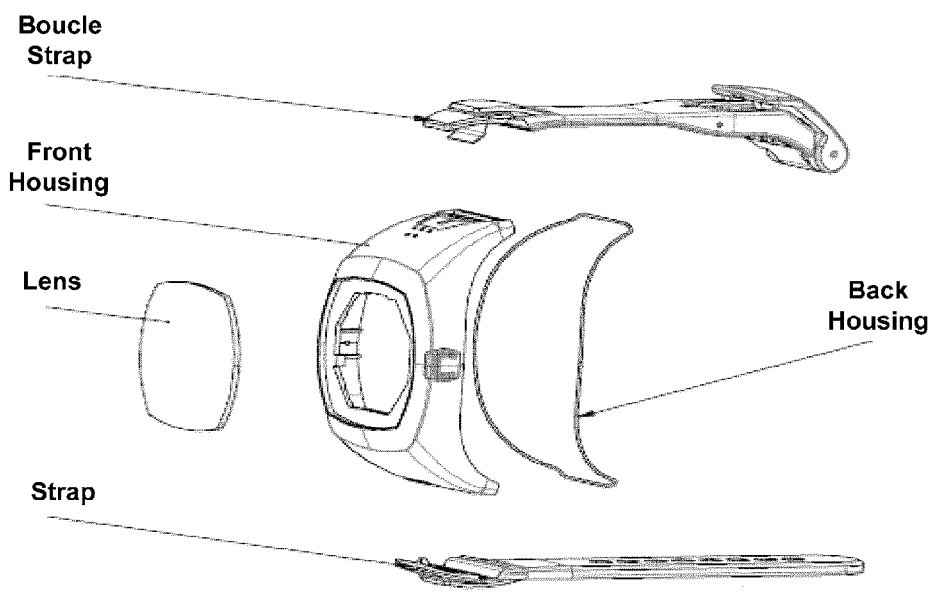
FIG. 9K is a schematic diagram illustrating a breakout view of the housing of the locator device of FIG. 9E in accordance with the specific implementation of the proposed solution.

FIG. 9K illustrates a breakout view of the personal locator housing whereby the strap assemblies are attached to the main top assembly by means of gluing and ultrasonic welding providing a waterproof seal. Other ways of attachment can be employed depending on materials employed, without limiting the invention.

With reference to FIGS. 9E and 9C, the buckle can employ a buckle lock requiring the use of a non-standard key to unlock so that once placed on an individual, the individual locator cannot be left behind or easily lost. The key may or may not be required for locking of the clasp. Preferably the housing is robust to take substantially daily abuse.

Figure 9L:
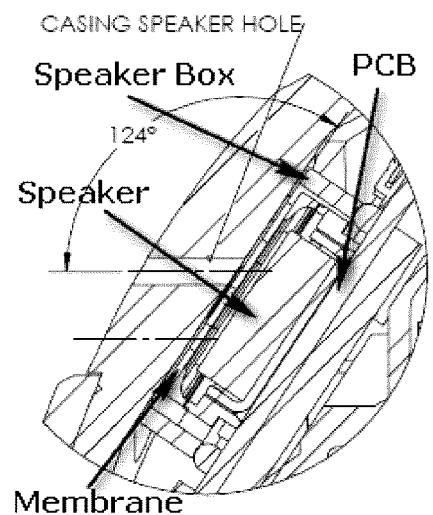
FIG. 9L is a schematic diagram illustrating integration details the housing of the locator device of FIG. 9E and an audio box in accordance with the specific implementation of the proposed solution.
Figure 9M:
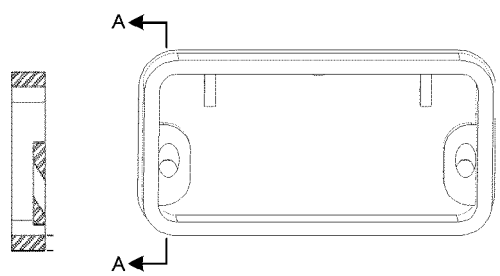
FIG. 9M is a schematic diagram illustrating details the audio box of the locator device of FIG. 9E in accordance with the specific implementation of the proposed solution.
Figure 9N:
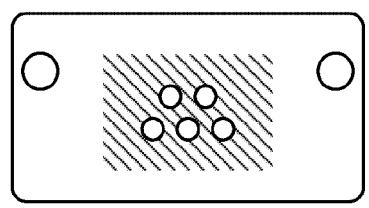
FIG. 9N is a schematic diagram illustrating details of a membrane providing water proofing for the locator device of FIG. 9E in accordance with the specific implementation of the proposed solution.

FIGS. 9L, 9M and 9N illustrate manufacturing details of a speaker assembly for applications providing listen-only and two-way communications. The speaker assembly includes, for example, a rectangular speaker, and a printed circuit board (PCB assembly) providing an audio electrical signal to the speaker. A speaker box (shown in FIG. 9H) is preferably employed to control a volume of air displaced by the speaker to improve the quality and sound pressure level (SPL) of emitted audio. An acoustic membrane best illustrated in FIG. 9N allows sound to propagate with minimal attenuation while providing a waterproof seal;

FIG. 9M illustrates the speaker box including spars for holding the speaker centered within the assembly/housing and a number of mounting holes which may be offset at an angle to mate with mounting pins located on the inside surface of the front housing cover assembly.

FIG. 9N illustrates details of the acoustic membrane comprising a glue zone following the circumference of the membrane with a rectangular area (shaded) void of any glue allowing sound and air to pass with minimal attenuation. An attenuation of less then 1 dBa can be achieved with a Gore-Tex™ membrane.

The invention is not limited to a particular housing, it would be possible to employ a different housing for different applications whilst using the same core components as for the wearable implementation referred to herein.

In accordance with low security implementations of the embodiment of the proposed solution, for the purpose of minding museum patrons and/or visitors, the individual locator can be implemented in a mobile telephone in which case the mobile telephone housing is the individual locator housing. The mobile telephone need not be limited to a cellular telephone, for example for the purpose of minding visitors in an open pit mine or on an oil platform, the mobile telephone can be a satellite telephone. For (low) security applications the housing can be worn loosely around ones neck or pinned as a visitor tag. Implementation in a name tag can also have applications in the banking industry and site inspection scenarios. For such low security deployment scenarios, an app with the requisite functionality can be downloaded to enable individual locator functionality.

In some implementations, a single button is provided to perform multiple tasks. The single button that can be fully disabled for example for persons with Autism. The housing contains an electronics sub-assembly and a rechargeable battery. The rechargeable battery can be charged using an external charger for example compatible with USB power standards and connected to the locator via a concealed connector. The multifunction beacon can operate as the external charger as described herein.

In other implementations the individual locator includes a display, preferably a Liquid Crystal Display (LCD) display, configured to normally display time along with the cell signal power level and battery level, wherein the button can be interacted with, for example to show date and day of week.

Figure 10:
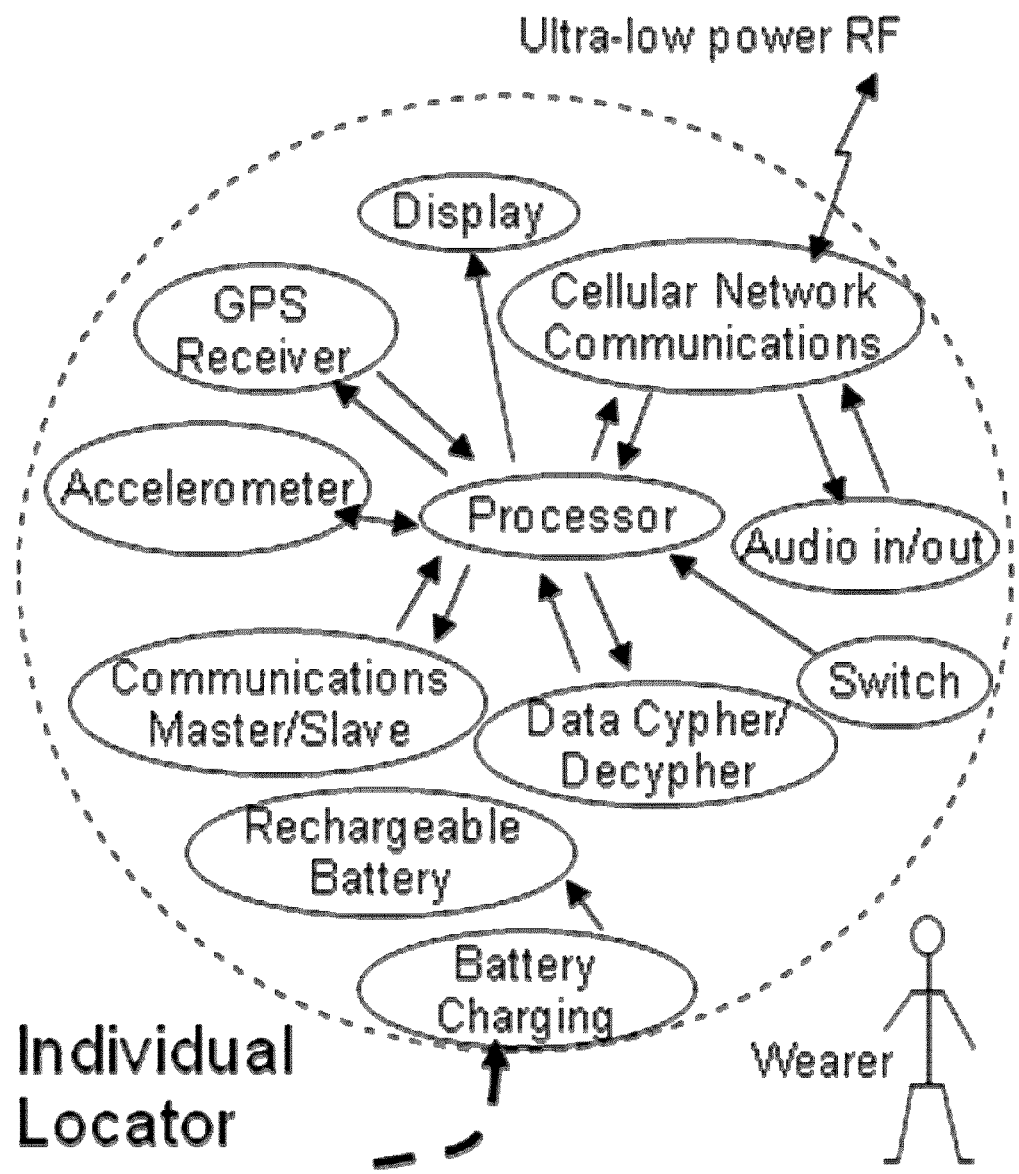
FIG. 10 is a schematic diagram illustrating sample components of an individual locator device in accordance with an embodiment of the proposed solution.

In yet other implementations, the individual locator includes an accelerometer illustrated in FIGS. 1 and 10, preferably a multi-axis accelerometer. The accelerometer can be configured to support the implementation of multiple functions, for example the accelerometer can be used to detect movement, lack of movement, fall condition, tapping of the locator device to alter the LCD display mode and/or to disable airplane mode. Preferably, to further reduce average power consumption of the individual locator device, the LCD module is normally in the off state, only being turned on for a pre-established period of time whenever the locator device is positioned in a generally horizontal position that is within preset parameters of the multi-axis accelerometer.

In accordance with the proposed solution, the individual locator includes speaker and microphone for voice communication and is configured to auto-answer voice calls in hands free mode.

The Bluetooth 4.0 transceiver provides interoperability with other BLE 4.0 devices such as sensor modules. Returning to the embodiment of the proposed solution, individual locator Bluetooth 4.0 transmit power levels can be fixed or variably set. Preferably, the individual locator device employs a low power mode of operation while within the transmission range level of the multifunction beacon according to preset parameters. The Bluetooth 4.0 transceiver is normally in master communications mode allowing the individual locator device to wirelessly communicate with multiple Bluetooth compatible devices.

The locator processor is configured to coordinate all functions of the individual locator device including: battery level monitoring, power mode switching, radio power control, data storage and transfer, LCD display refresh, accelerometer readout and, bio-sensor readings. The locator processor using pre-defined parameters set by the care giver is configured to assess alert conditions:

Low Power Mode

In accordance with the proposed solution, the individual locator is intended for long term substantially continuous use and can operate in a low power mode.

In accordance with a preferred implementation, intelligent power saving is implemented in low power mode. The individual locator is always active and under control of communications scheduling and power modes, modes which can be implemented either via discrete electronic components, in programmable logic arrays and/or firmware executed by a low power microprocessor. The individual locator, via the scheduling and power modes is configured to: selectively power down at least: the long distance communications transceiver, the GPS component and Bluetooth 4.0 transmitter; count down a time interval in a countdown register; receive intermittent input signals from the Bluetooth 4.0 receiver; determine whether a received input signal corresponds to a known beacon; reset the countdown register to the countdown interval if the received input signal corresponds to a known beacon; and fully activate the individual locator ultimately raising an alarm when the countdown register experiences a carryover condition. When in range of a known beacon, the locator processor sets the GPS receiver and long distance communications (cellular network) transceiver to a very low power mode while remaining active to receive voice calls or data. A number of communications scheduling techniques can be implemented to reduce exposure to high power consumption in a dense beacon environment.

In accordance with the proposed solution, in addition to the above functionality, in low power mode the locator processor is configured to periodically fully activate the individual locator for checking-in via long distance communications with a remote monitoring station to provide geolocation information without raising an alarm. If outdoors, geolocation information corresponds to geolocation coordinates provided by the GPS component, GPS component which in low power mode can be provided with some power for example to maintain state information but preferably the GPS receiver restarts following a cold restart protocol. The individual locator is designed to operate for better than 72 hours continuously while automatically communicating location information periodically every 60 minutes when outdoors.

If the individual locator is indoors, geolocation information corresponds to location information provided in passive beacon device signals. Monitored persons spend their time mostly indoors where GPS signals are less reliable. To conserve power the locator processor is configured to turn off the GPS component while indoors. For example this can be implemented by receiving a passive beacon signal registered with the individual locator or when the locator processor judges that the individual locator is inside the monitored perimeter.

In accordance with an implementation, being inside the perimeter is determined by the individual locator processor for a beacon signal for example by comparing the received signal strength value provided in a (Received Signal Strength Indicator) RSSI specification and a transmission (Tx) power level value provided in a corresponding specification.

No additional wireless network is required for the individual locator to communicate with the monitoring station while the individual locator is indoors because the location is communicated by the individual locator device via the long distance communications for example via the public cellular network or the satellite communications.

In accordance with another implementation a going for a walk use scenario is provided by the individual locator being configured to listen for active beacon signals and configured to switch the individual locator to master mode by activating all components individual locator if a signal active beacon is received from a multifunction beacon registered with the individual locator. As a first step in master mode after an active beacon signal is received from a multifunction beacon, the remote monitoring station is contacted via the long communications without raising an alarm. After checking-in with the monitoring station, the individual locator can return to low power mode and resume periodic check-in functionality. In this way, a minder can unplug the multifunction beacon registered with the individual locator and take it along with the monitored individual for a walk, when the multifunction beacon is unplugged, the multifunction beacon outputs an active beacon signal and the individual locator device goes automatically to master mode from low power mode to report to the monitoring station the change in power supply state of the multifunction beacon.

Master Mode

In accordance with the proposed solution, activation of the individual locator places the individual locator in a master mode at least with respect to Bluetooth communications. In master mode, the Bluetooth 4.0 transceiver is configured to monitor at least one sensor, for example a biometric sensor, receiving sensor readings. In master mode, the locator processor is configured to obtain sensor readings, compare sensor readings with sensor value thresholds, store sensor readings, package sensor readings for upload to the monitoring station, establish communications with the monitoring station, and selectively raise an alarm based on a sensor reading.

In accordance with the embodiment of the proposed solution locator processor can be configured to enforce the perimeter and raise the alarm.

For certainty, raising any alarm entails turning on the GPS component and long range communications component if not already on, establishing communications with the monitoring station, providing geolocation information, providing alarm details and preferably sensor readings. In the alarm state due to a sensor out of bounds or due to individual locator outside the perimeter, the GPS receiver is normally held in a low power mode but able to periodically resolve a GPS coordinate request within 15 seconds every minute for near real time geolocation reporting and monitoring. Such a fast response can be provided by keeping the GPS in a state from which a hot start can be used.

In accordance with an implementation, a digital output of the reed switch described herein immediately above, is fed back to the passive beacon device which changes a status register to an alarmed state and/or causes the passive beacon to transmit an active beacon signal. At the same time the individual locator is in close proximity to the reed switch beacon on the door, the individual locator receives the beacon type ID "reed switch beacon", receives the status of the beacon alarmed or receives an active beacon signal. If the door is closed the reed switch beacon appears as a passive beacon. Therefore, if and only if a change in the state of the door is detected by the reed switch beacon, the locator processor commands the individual locator to switch to a monitoring mode (as described herein with reference to Monitoring Mode) and transmits an alert status along with the location information read from the passive beacon to the monitoring station.

Programming Mode

In accordance with the proposed solution, the individual locator is configured to be commanded to operate in a programming mode. In accordance with the proposed solution, monitoring functionality, even if limited, is maintained during programming mode. For example, silent listen-in functionality and/or sensor reporting functionality can be activated or remain active during programming mode.

In accordance with one use scenario, the monitoring station places the individual locator in programming mode, for example via a Short Messaging Service (SMS) text message or during the messaging exchange when the individual locator checks in with the monitoring station via long distance communications. In accordance with another embodiment, either by a special beacon signal format, and/or via in-band Bluetooth 4.0 signaling, the multifunction beacon can command the individual locator to enter programming mode.

In programming mode, the individual locator continues monitoring the perimeter, for example employing the locator processor at a lower perimeter monitoring rate. If the individual locator is in communication with the monitoring station, sensor reading reporting can selectively continue at full or reduced rate, as well if silent listen-in is activated silent listen-in preferably continues uninterrupted.

Programming instructions are conveyed to the individual locator from the monitoring station and are implemented by the locator processor either immediately or queued for subsequent execution. Preferably, programming instructions originating from the location server are normally executed immediately however in instances whereby the individual locator cannot communicate with the public cellular network, those instructions will be queued for execution as soon as communication is re-established, this could occur when traveling by air and the airplane mode is enabled.

In accordance with the proposed solution, an ignore passive beacons instruction is conveyed to the individual locator by a setup command from the location server website user interface or directly using a compatible Bluetooth 4.0 device in order to provide an electronic tether within a moving perimeter between the individual locator and the multifunction beacon, with or without continuous geolocation reporting. For example, the monitored persons and the minder can walk outside the monitored perimeter without raising an alarm.

In accordance with one implementation, a register/deregister passive beacon instruction is conveyed to the individual locator by a setup command from the location server website user interface or directly using a compatible Bluetooth 4.0 device. A register/deregister multifunction beacon instruction is conveyed to the individual locator by a setup command from the location server website user interface or directly using a compatible Bluetooth 4.0 device. All beacons of a given beacon type ID will be registered or deregistered from the locator. A countdown register reset value can be conveyed to the individual locator and for storage in the countdown register. A check-in period value can be conveyed to the individual locator and enunciated to the wearing individual audibly and textually displayed on the LCD screen. A acknowledge or check-in action can be demanded during setup requiring the wearer of the individual locator to press the multifunction button. If the wearer does not press the multifunction button within a pre-determined period of time, the enunciation will repeat and an alert transmitted to a care giver or monitoring service. A register/deregister sensor instruction can be conveyed to the individual locator by a setup command from the location server website user interface.

In accordance with a further implementation, a raise alarm instruction can be conveyed to the individual locator and communicated to a care giver or monitoring service in order for the minder to signal that control over the monitored individual has been lost. The raise alarm instruction commands the individual locator into the fully operational master mode.

In accordance with yet another implementation, a sleep instruction can be conveyed to the individual locator by SMS, by a setup command from the location server website user interface or directly using a compatible Bluetooth 4.0 device in order to implement an airplane mode for an expected (take-off or landing duration) flight of an airplane. During sleep mode, all wireless communication functions of the individual locator are commanded off and if any vitals are monitored non-wirelessly okay/trouble status is visually output for example via a low power LED or other means. Once the plane has landed, the sleep condition can be disabled and the individual locator returned to its normal mode of operation by tapping the locator display a pre-determined number of times or holding the multifunction button for a pre-determined period of time. Without limiting the invention, button presses can be implemented by detecting corresponding gestures via the accelerometer.

Optional Distress Signal

As mentioned hereinabove, the personal locator preferably includes a silent listen-in function. The individual locator auto-answers voice calls hands free. The silent listen-in function is setup by command from the location server website user interface prior to using the voice communication feature of the individual locator. When silent mode is enabled, inbound calls to the individual locator will not ring audibly, nor will the initiator be heard however, a call indicator icon may appear on the LCD display. When enabled, outbound calls initiated by pressing the multifunction button will mute the individual locator speaker so as not to hear the ring tone or voices and background noise from the recipient, however, a call indicator icon will appear on the LCD display.

Geolocation

It is appreciated that a GPS module is not strictly required when the individual locator includes a recent generation cellular phone as the long distance communication module. $2^{nd}$ Generation and later cellular phones implement rough geolocation via cell signal triangulation functionality provided by standards compliant cell phone towers know as Assisted GPS (A-GPS). When the individual locator needs to report its position, preferably turning on the GPS is delayed to conserve power at last until long distance communications are established with the cellular phone network, and more preferably until triangulation reliability is determined. Of course, the individual locator can be configured to turn on the GPS module if less than two cell phone towers are in cellular communications range so that the cellular communications module startup and the GPS startup sequences overlap as much as possible.

Figure 11:
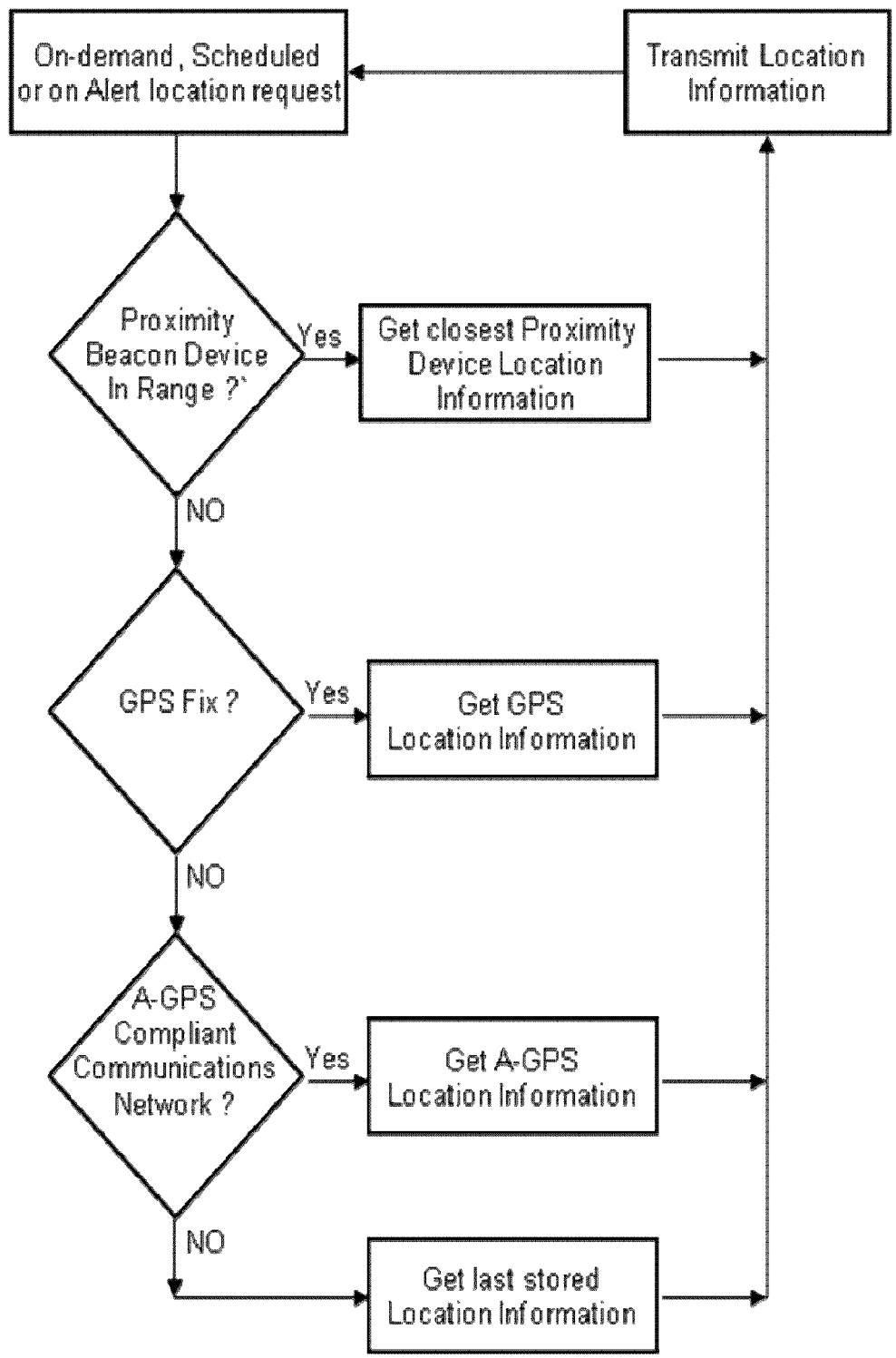
FIG. 11 is a schematic flow diagram illustrating a hierarchical method for communicating the individual locator device location according to location information availability, in accordance with the proposed solution.

FIG. 11 illustrates a major operational loop followed by the locator processor in accordance with the proposed solution for checking-in with the monitoring station. The process starts either due to a position request, periodic check-in or due to an alert condition (power status change of multifunction beacon, perimeter violation, sensor out of bound condition). If a beacon is in range, the location of the closest beacon is reported to the monitoring station. If a beacon signal is not received, an the processor checks to see if a GPS fix is available, obtain GPS geolocation through the GPS component and the geolocation is transmitted to the monitoring station. If a GPS fix is not available an attempt is made to obtain an A-GPS location through the long distance communications component such as GSM tower triangulation. If the long distance communications network provides A-GPS, the A-GPS geolocation is obtained and communicated to the monitoring station. If the long distance communications network does not provide A-GPS, the last stored location is communicated to the monitoring station.

The GPS receiver processes geo-location information received from a network of GPS satellites and provides that information to the locator processor for further refinement using ephemeris data stored in the non-volatile memory. Employing a satellite long range communications module, the GPS may be required to turn on even before turning on the satellite long range communications module in order to obtain a correct time and geolocation before satellites are listened to.

While extensive reference has been made to a GPS, the invention is not limited to the use of the current American military GPS system using the civilian signal. GPS as referred to herein is to be understood in its functional context not limited to the trade phrase currently synonymous with the American military run service. GPS is intended to include: the current American military GPS system using the military signal, Russia's GLONASS global navigation system currently fully operational worldwide, European Union's Galileo a global positioning system currently in testing with planned full operability by 2014, People's Republic of China's Beidou regional navigation and emergency system currently limited to Asia and the West Pacific, People's Republic of China's planned COMPASS global positioning system currently in deployment expected to be operational by 2020, India's IRNSS regional navigation and emergency system currently reaching full operation covering India and Northern Indian Ocean, Japan's QZSS regional navigation and emergency system covering Asia and Oceania, either severally or in combination.

The invention is not limited to security or medical applications, and applies to monitoring the geolocation of an individual with respect to a perimeter. For certainty the perimeter need not be fixed in geographic terms.

For certainty, processor functionality is understood to be employed in either in sequence or in parallel between the beacon and locator processors not limited to the description above.

While the invention has been shown and described with referenced to preferred embodiments thereof, it will be recognized by those skilled in the art that various changes in form and detail may be made therein without departing from the spirit and scope of the invention as defined by the appended claims.

What is claimed is:

1. An individual locator system comprising:
   at least one individual locator to be worn by at least one corresponding individual, said locator unit having a battery, a local wireless transceiver, a long range communications transceiver and a GPS receiver powered by said battery, said GPS receiver receiving satellite signals and calculating a GPS location;
   a plurality of battery powered wireless beacons configured to transmit an identification signal with a predetermined signal strength and installed in different locations within an indoor or an outdoor facility for reception by said local wireless transceiver of said at least one individual locator within a designated room or area associated with said facility, said beacons being arranged within said facility such that said individual locator receives the identification signal of one or more of said beacons; and
   said individual locator being configured to determine a locator location by detecting said identification signal of said beacons and selecting as said locator location a beacon location of one of said beacons corresponding with said identification signal, to remove power supplied la said battery to said GPS receiver when said locator location can be determined from said beacon location allowing battery power to be preserved, and to provide power to said GPS receiver from the battery to determine said GPS location when said location cannot be determined from said beacons, wherein said long range communications transceiver provides said locator location as whereabouts of the individual locator to a monitoring station.

2. A system as claimed in claim 1, wherein said beacons comprise Bluetooth low energy protocol transceivers.

3. A system as claimed in claim 1, wherein said long range communications transceiver is one of a cellular telephone network transceiver and a satellite telephone network transceiver, said long range communications transceiver being configured to obtain a geolocation from a corresponding long range communications network.

4. A system as claimed in claim 1, wherein the said locator comprises a locator processor, said locator processor being configured attempt to obtain position information via the long range communications transceiver if said GPS location cannot be obtained.

5. A system as claimed in claim 4, wherein said locator processor is further configured to transmit to said monitoring station a last known location if an Assisted GPS (A-GPS) location cannot be obtained from a cellular telephone network via the long range communications transceiver.

6. A system as claimed in claim 4, further comprising persistent storage for storing at least one of: a perimeter definition and Bluetooth communications state data for pairing said individual locator with at least one remote sensor, said locator processor being configured to command the individual locator in a monitoring mode for alerting said monitoring station of at least one condition form: location information cannot be determined from at least one of said beacons and a remote sensor value received from one of said sensors is out of valid range.

7. A system as claimed in claim 1, wherein said individual locator is further configured to receive a programming signal and configured to place said individual locator in a programming mode, wherein during programming mode said locator processor is configured to continue one of: periodic location reporting and remote sensor value reporting.

8. A system as claimed in claim 1, comprising a housing, said housing being one of wrist mounted device, ankle mounted device, a pendant and a personal name tag.

9. A system as claimed in claim 8, wherein said housing further comprises a button, wherein said individual locator is configured to receive a programming signal for placing the individual locator in an airplane mode preventing wireless transmissions, and configured to place the individual locator in said monitoring mode after the locator processor detects a specific interaction pattern with the button in airplane mode.

10. A system as claimed in claim 1, wherein said individual locator further comprises an accelerometer and a display, said accelerometer being configured provide at least one of: cause said display to be powered when said individual locator is oriented horizontally and implement a button push action when said accelerometer registers a sequence of measurements representative of a button push gesture.

11. A system as claimed in claim 1, wherein one of said battery powered wireless beacons comprises a passive beacon, said passive beacon being configured to provide at least one of: a beacon device type identifier, a location specification, a location identifier, a beacon identifier, a passive beacon signal and a monitored individual identifier.

12. A system as claimed in claim 1, wherein one of said battery powered wireless beacons comprises a relay passive beacon, said relay passive beacon, being configured to provide at least one of: a beacon device type identifier, a location specification, a location identifier, a beacon identifier, a passive beacon signal and a monitored individual identifier, said relay beacon being further configured to provide at least one of: a contact and a digital output signal when at least one particular individual locator is in communications range.

13. A system as claimed in claim 1, wherein one of said battery powered wireless beacons comprises a reed switch passive beacon, said reed switch passive beacon, being configured to provide at least one of: a beacon device type identifier, a location specification, a location identifier, a beacon identifier, a passive beacon signal, an active beacon signal and a monitored individual identifier, said reed switch passive beacon being further configured to provide at least one of: a contact and a digital output signal when at least one particular individual locator is in communications range and the reed switch status is changed.

14. A system as claimed in claim 1, wherein one of said wireless beacons comprises a motion sensor passive beacon, said motion sensor passive beacon, being configured to provide at least one of: a beacon device type identifier, a location specification, a location identifier, a beacon identifier, a passive beacon signal, an active beacon signal and a monitored individual identifier, said motion sensor passive beacon being further configured to provide at least one of: said active beacon signal, a contact and a digital output signal when at least one particular individual locator is in communications range and the motion sensor is tripped.

15. A system as claimed in claim 3, wherein the said locator comprises a locator processor, said locator processor being configured attempt to obtain position information via the long-range communications transceiver if a GPS fix cannot be obtained.

16. A system as claimed in claim 5, further comprising persistent storage for storing at least one of: a perimeter definition and Bluetooth communications state data for pairing said individual locator with at least one remote sensor, said locator processor being configured to command the individual locator in a monitoring mode for alerting said monitoring station of at least one condition form: location information cannot be determined from at least one of said beacons and a remote sensor value received from one of said sensors is out of valid range.

* * * * *